US011661490B2

(12) United States Patent
Oku et al.

(10) Patent No.: US 11,661,490 B2
(45) Date of Patent: May 30, 2023

(54) METHOD OF PRODUCING POROUS MOLDED BODY

(71) Applicant: FUJIFILM Corporation, Tokyo (JP)

(72) Inventors: Keisuke Oku, Minami-ashigara (JP); Koju Ito, Minami-ashigara (JP); Hiroshi Yabu, Sendai (JP); Yoshiaki Uchida, Toyonaka (JP)

(73) Assignee: FUJIFILM Corporation, Tokyo (JP)

( * ) Notice: Subject to any disclaimer, the term of this patent is extended or adjusted under 35 U.S.C. 154(b) by 357 days.

(21) Appl. No.: 16/936,085

(22) Filed: Jul. 22, 2020

(65) Prior Publication Data

US 2020/0347199 A1    Nov. 5, 2020

Related U.S. Application Data

(63) Continuation of application No. PCT/JP2019/001730, filed on Jan. 21, 2019.

(30) Foreign Application Priority Data

Jan. 23, 2018    (JP) .............................. JP2018-008561

(51) Int. Cl.
*C08J 9/00* (2006.01)
*C08J 9/28* (2006.01)
(Continued)

(52) U.S. Cl.
CPC .............. *C08J 9/26* (2013.01); *C08J 9/0004* (2013.01); *C08J 9/283* (2013.01); *B01F 23/4141* (2022.01); *C08J 2201/028* (2013.01)

(58) Field of Classification Search
CPC .......................... C08J 2201/028; C08J 9/283
See application file for complete search history.

(56) References Cited

U.S. PATENT DOCUMENTS 6,299,808 B1 * 10/2001 Mork .................... C08J 9/28
                                                         521/64
2018/0104922 A1    4/2018 Büsgen et al.
2018/0361347 A1   12/2018 Iwai et al.

FOREIGN PATENT DOCUMENTS

CN    105968402 A    9/2016
CN    107438510 A   12/2017
(Continued)

OTHER PUBLICATIONS

Extended European Search Report for corresponding European Application No. 19744332.8, dated Feb. 2, 2021.
Japanese Notice of Reasons for Refusal for corresponding Japanese Application No. 2019-567066, dated Aug. 17, 2021, with an English translation.
(Continued)

*Primary Examiner* — Stephen E Rieth
(74) *Attorney, Agent, or Firm* — Birch, Stewart, Kolasch & Birch, LLP

(57) ABSTRACT

A molded body is produced from a molding material including a continuous phase and a dispersed phase by a three-dimensionalization step, a curing step, and a peeling step. The continuous phase of the molding material is a water phase containing a curable compound. In the three-dimensionalization step, the molding material is placed in a container. In the curing step, the curable compound is cured to form a cured product after the three-dimensionalization step. In the peeling step, the container and the cured product are separated after the curing step. In the dispersed phase removal step, the dispersed phase of the cured product is removed after the curing step.

7 Claims, 14 Drawing Sheets

(51) Int. Cl.
*B01F 23/41* (2022.01)
*C08J 9/26* (2006.01)

(56) References Cited

FOREIGN PATENT DOCUMENTS

| | | | |
|---|---|---|---|
| EP | 3392299 | A1 | 10/2018 |
| JP | 56-61437 | A | 5/1981 |
| JP | 2009-268836 | A | 11/2009 |
| JP | 2013-147521 | A | 8/2013 |
| WO | WO 2009/041376 | A1 | 4/2009 |
| WO | WO 2017/104610 | A1 | 6/2017 |
| WO | WO-2018161155 | A1 * | 9/2018 ................ C08J 3/03 |

OTHER PUBLICATIONS

Taiwanese Office Action and Search Report for corresponding Taiwanese Application No. 108102588, dated Jul. 29, 2022, with an English translation.

International Preliminary Report on Patentability and Written Opinion of the International Searching Authority with an English translation, dated Aug. 6, 2020, for corresponding International Application No. PCT/JP2019/001730.

International Search Report, dated Apr. 23, 2019, for corresponding International Application No. PCT/JP2019/001730, with an English translation.

Chinese Office Action and Search Report for corresponding Chinese Application No. 201980009446.1, dated Mar. 14, 2022, with English translation.

\* cited by examiner

METHOD OF PRODUCING POROUS MOLDED BODY

CROSS-REFERENCE TO RELATED APPLICATIONS

This application is a Continuation of PCT International Application No. PCT/JP2019/001730 filed on 21 Jan. 2019, which claims priority under 35 U.S.C. § 119(a) to Japanese Patent Application No. 2018-008561 filed on 23 Jan. 2018. The above application is hereby expressly incorporated by reference, in its entirety, into the present application.

BACKGROUND OF THE INVENTION

1. Field of the Invention

The present invention relates to a method of producing a porous molded body.

2. Description of the Related Art

As a porous molded body, a film-like porous molded body (hereinafter, referred to as a porous film) having a honeycomb structure formed by regularly forming a plurality of fine pore portions to be aligned along a film surface is known. The porous film having a honeycomb structure is produced by a dew condensation method (also referred to as a breath figure method). The dew condensation method is a method in which a solution including a hydrophobic material for forming a film is cast to form a cast film, dew is condensed on this cast film, and then a solvent and water droplets are evaporated, thereby producing a film. Since the water droplets act as casting molds and a plurality of extremely fine pore portions are formed in a state of being regularly arranged, for example, the porous film obtained by the dew condensation method is useful in a medical field such as a culture carrier (cell culture base) for culturing cells, a synechia preventive material, or a filter.

In the dew condensation method, since water droplets are used as casting molds as described above, a porous film cannot be produced using a hydrophilic material, and the diameter of the formed voids is limited. In this regard, WO2017/104610A (corresponding to US2018/0361347A1) discloses a porous film which has voids to be formed with a diameter larger than the diameter of voids of the porous film produced by the above-described dew condensation method and is constituted of a hydrophilic material. The porous film of WO2017/104610A is produced through a step of injecting an emulsion including a dispersed phase and a continuous phase between a pair of substrates arranged in parallel by a capillary phenomenon. As described above, in the production method using the emulsion, the dispersed phase of the emulsion functions as a casting mold for forming a void. JP-S56-061437A (JP1981-061437A) also discloses a method of producing a porous film constituted of a hydrophilic material using an emulsion.

JP2009-268836A discloses a method of producing an inverse opal structure including cellulose. The cellulose porous structure is produced by impregnating a colloidal crystal obtained from silica particles having a particle size of 200 nm to 500 nm with a solution indulging cellulose, solidifying the colloidal crystal, and then removing the silica particles by etching. Since this structure is obtained by using the colloidal crystal as a casting mold, the diameter of the pore portions of the obtained structure is substantially the same as the diameter of the colloidal crystal.

SUMMARY OF THE INVENTION

The material constituting the porous film produced by the dew condensation method is limited to a hydrophobic material due to the production method in which water droplets are used as casting molds as described above. In addition, the molded body that can be formed by the dew condensation method is a thin material called a film. In the production methods in WO2017/104610A, JP-S56-061437A (JP1981-061437A), and JP2009-268836A, although a porous molded body formed of a hydrophilic material is obtained, the obtained porous molded body is limited to a thin material called a film. Although the porous film in JP-S56-061437A (JP1981-061437A) has a high void volume (a volume ratio occupied by pore portions), the arrangement state of the pore portions lacks orderliness and cannot be said to have regularity. Further, according to the production method of JP2009-268836A, only a film having a pore portion having a small diameter of 10 to 1000 nm can be obtained.

Therefore, an object of the present invention is to provide a method of producing a porous molded body which is constituted of a hydrophilic material and has voids densely arranged with regularity.

In order to solve the above problems, a method of producing a porous molded body according to an aspect of the present invention includes a three-dimensionalization step, a curing step, a peeling step, and a dispersed phase removal step, and is provided for producing a porous molded body from an emulsion including a continuous phase and a dispersed phase. In the three-dimensionalization step, the emulsion including a water phase containing a curable compound as the continuous phase is placed in a container. In the curing step, after the three-dimensionalization step, the curable compound is cured to form a cured product. In the peeling step, the container and the cured product are separated after the curing step. In the dispersed phase removal step, the dispersed phase of the cured product is removed after the curing step. In the emulsion, in a case where a volume of the dispersed phase is X1 and a volume of the continuous phase is X2, a value of X1/(X1+X2) is within a range of 0.5 or more and 0.9 or less, and a specific gravity of the dispersed phase is greater than a specific gravity of the continuous phase.

It is preferable that the method further comprises a continuous phase removal step of removing the continuous phase present in an upper part of the emulsion in the container after the three-dimensionalization step and before the curing step.

It is preferable that in the dispersed phase removal step, a solvent of the dispersed phase is brought into contact with the cured product to remove the dispersed phase.

It is preferable that liquid droplets of the dispersed phase are freely deformable.

It is preferable that in the emulsion, in a case where a specific gravity of the dispersed phase is Y1 and a specific gravity of the continuous phase is Y2, a specific gravity difference obtained by Y1−Y2 is at least 0.001.

It is preferable that the container is formed of a hydrophobic material.

It is preferable that in the three-dimensionalization step, the emulsion is placed in the moving container.

In addition, a method of producing a porous molded body according to another aspect of the present invention comprises an additive manufacturing step and a dispersed phase removal step, and is provided for producing a porous molded body from an emulsion including a continuous phase and a dispersed phase. In the additive manufacturing step, a cured product is formed using an emulsion by an additive manufacturing method. In the dispersed phase removal step, the dispersed phase of the cured product is removed after the additive manufacturing step. In a case where a volume of the dispersed phase is X1 and a volume of the continuous phase is X2, a value of X1/(X1+X2) is within a range of 0.5 or more and 0.9 or less, and a specific gravity of the dispersed phase is greater than a specific gravity of the continuous phase.

It is preferable that the additive manufacturing step has a layer forming step having a jetting step of jetting the emulsion from a material nozzle that jets the emulsion toward a forming table disposed below the material nozzle to form one layer, and a layer curing step of curing the one layer to form a cured layer after the jetting step, and the cured product in which the cured layer is laminated is formed by repeating the layer forming step.

It is preferable that the jetting step has a first jetting step of jetting the emulsion from the material nozzle, and a second jetting step of jetting a curable support resin from a support resin nozzle toward the forming table, and, in the layer curing step, an emulsion region formed by the first jetting step and a support resin region formed by the second jetting step are cured to form the emulsion region into the cured layer in a state in which the support resin is supported by a cured support layer.

It is preferable that the additive manufacturing step has an emulsion layer forming step of placing the emulsion in a bat provided with a forming table therein to form an emulsion layer, and a layer curing step of curing the emulsion layer to form a cured layer, and the cured product in which the cured layer is laminated is formed by repeating the layer forming step having the emulsion layer forming step and the layer curing step.

It is preferable that the method of producing a porous molded body further comprises a base production step and an uneven distribution step. In the base production step, a first liquid forming the dispersed phase is discharged as a liquid droplet in a flow of a second liquid forming the continuous phase from a distal end of a tubular member in a direction of the flow of the second liquid to produce an emulsion base having a value of X1/(X1+X2) smaller than that of the emulsion. In the uneven distribution step, the dispersed phase in the emulsion base is unevenly distributed to generate an uneven distribution region having a value of X1/(X1+X2) within a range of 0.5 or more and 0.9 or less in the emulsion base. It is preferable that in the three-dimensionalization step, the uneven distribution region generated in the emulsion base is used as the emulsion.

According to the aspects of the present invention, it is possible to produce a porous molded body which is constituted of a hydrophilic material and has voids densely arranged with regularity.

DESCRIPTION OF THE PREFERRED EMBODIMENTS

First Embodiment

Figure 1:
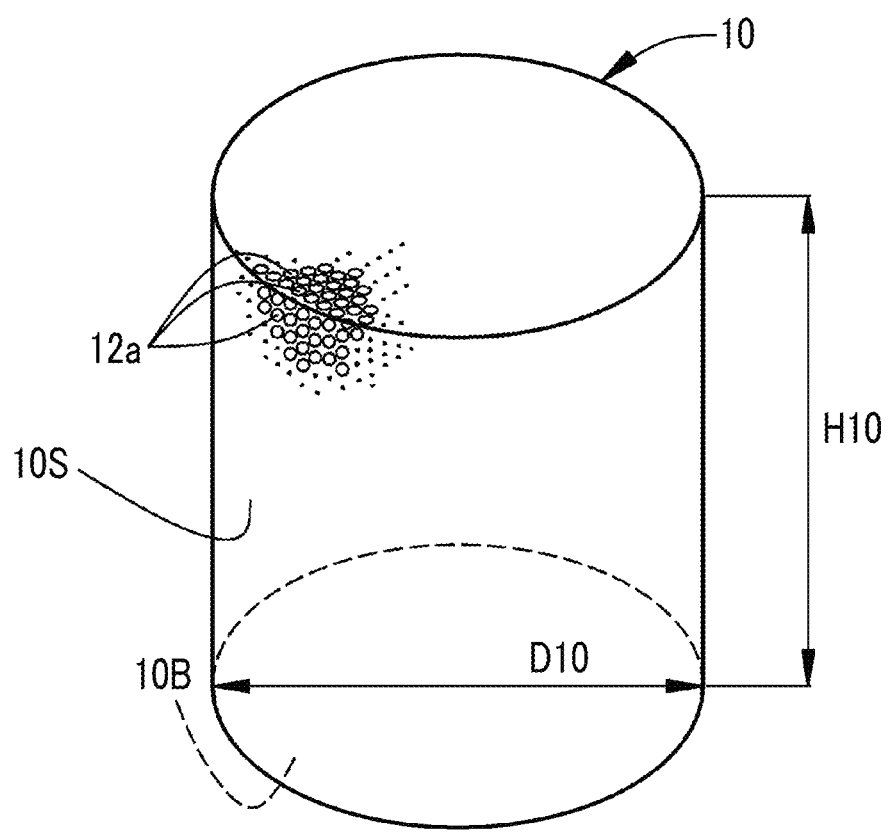
FIG. 1 is a perspective view of a porous molded body obtained according to a first embodiment of the present invention.

In FIG. 1, a porous molded body (hereinafter, also referred to as a molded body) 10 is formed in a cylindrical body, that is, a cylindrical shape having a circular cross section, and a bottom surface 10B has a diameter D10 of 10 mm and a height H10 of 10 mm. However, the shape and size are not limited to this example, and the smallest one of the dimensions in three orthogonal directions may be more than 1 mm. The molded body 10 has voids 12 therein and a plurality of opening portions 12a are formed in a surface 10S. The opening portion 12a is such that the void 12 is exposed on the surface 10S. That is, the molded body 10 has the voids 12 opened on the surface 10S. In FIG. 1, only some of the large number of opening portions 12a are illustrated in order to avoid complication of the drawing.

Figure 2:
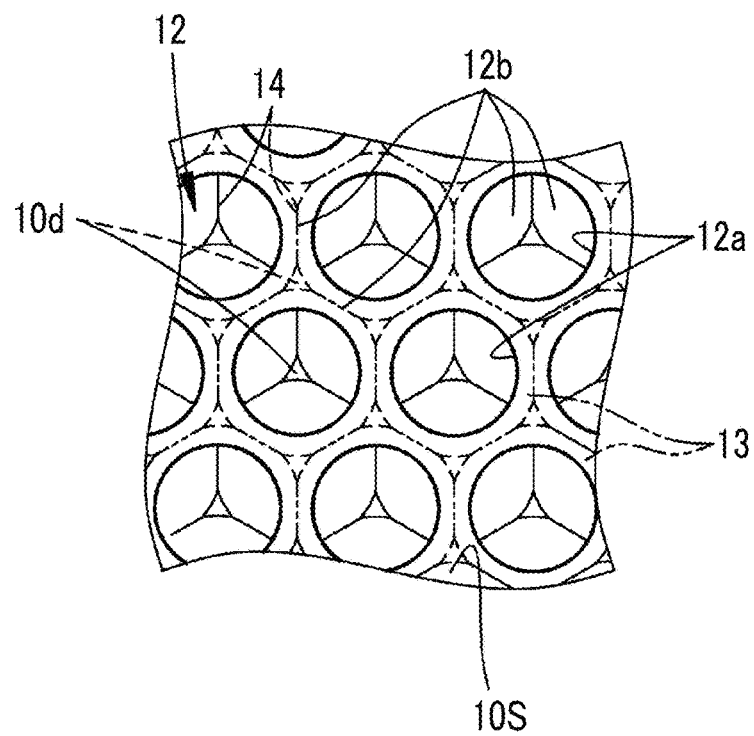
FIG. 2 is a schematic plan view showing a part of the surface of the porous molded body.

As shown in FIG. 2, a plurality of spherical pore portions 13 are continuous inside the molded body 10, and these pore portions 13 form the voids 12. Each pore portion 13 is a conceptual space portion virtually partitioned, and each pore portion 13 and each void 12 are defined by a hydrophilic material. That is, the molded body 10 is formed of a hydrophilic material and the voids 12 are formed by the plurality of spherical pore portions 13 communicating with each other through communication ports 12b formed in partition walls 14 between the pore portions 13. The voids 12 are formed by mutual communication of the plurality of pore portions 13 arranged in a close-packed structure. As shown in FIG. 2, the voids 12 are opened on the surface 10S. As described above, the voids 12 are formed by mutual communication of the spherical pore portions 13 arranged in a close-packed structure and are opened on the surface 10S to form the opening portions 12a. The pore portions 13 having substantially the same size are arranged in a close-packed structure on the surface 10S and inside the molded body 10.

For example, in a case where the molded body 10 is viewed from a direction perpendicular to the surface 10S, in a state in which six pore portions 13 are disposed around each vertex of a hexagon centered on one random pore portion 13, each pore portion 13 is densely arranged. Thus, the molded body 10 has a honeycomb structure having a honeycomb shape. In the specification, the "honeycomb structure" means not only a two-dimensional arrangement but also a three-dimensional space filling structure. Also, in the depth direction of the paper plane of FIG. 2 of the plurality of pore portions 13 forming the surface 10S, a plurality of pore portions 13 similarly forming a honeycomb structure are provided. Therefore, as shown in FIG. 2, the partition walls 14 between the pore portions 13 in the depth direction of the paper plane of FIG. 2 are confirmed in the opening portions 12a. As described above, the opening portions 12a are regularly arranged, and the communication ports 12b communicating with other pore portions 13 in contact with the pore portions 13 are regularly arranged in the opening portions 12a. Therefore, on the surface 10S of the molded body 10, a surface is formed in which the opening portions 12a are formed to have the substantially the same diameter, and in the molded body 10, the diameters of the opening portions 12a of the surface 10S are substantially the same. Since the molded body 10 is a cylindrical body, each of the side surface and the bottom surface of the molded body 10 can be referred to as a surface. However, on each surface of the molded body 10, the opening portions 12a are regularly arranged, and the diameters of the opening portions 12a are substantially the same in each surface. In the molded body according to the embodiment of the present invention, regardless of the shape of the molded body, the entire outer surface of the molded body can be referred to as "surface". Therefore, for example, even in a case where the surface of the molded body is a curved surface, the opening portions 12a are regularly arranged on the surface, and the diameters of the opening portions 12a are substantially the same.

Figure 3:
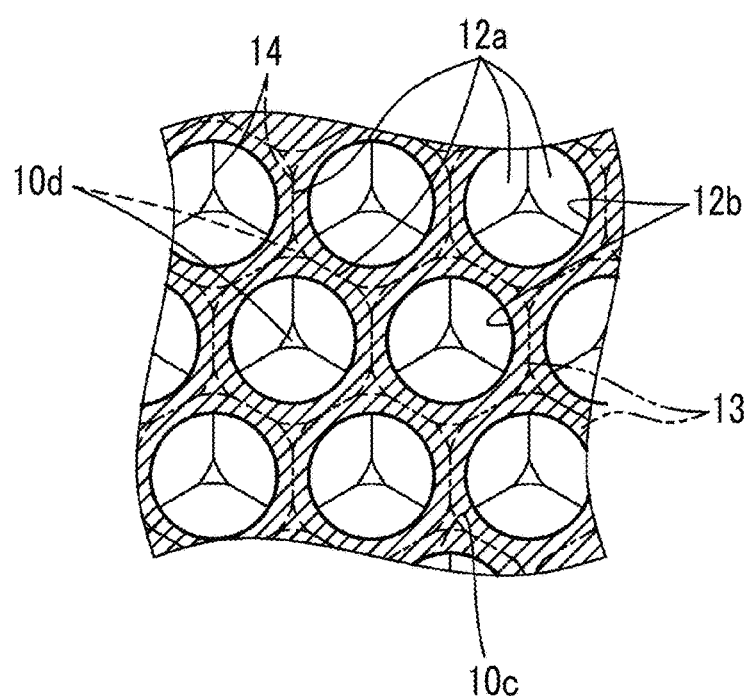
FIG. 3 is a schematic cross-sectional view showing a part of a cross section of the porous molded body.
Figure 5:
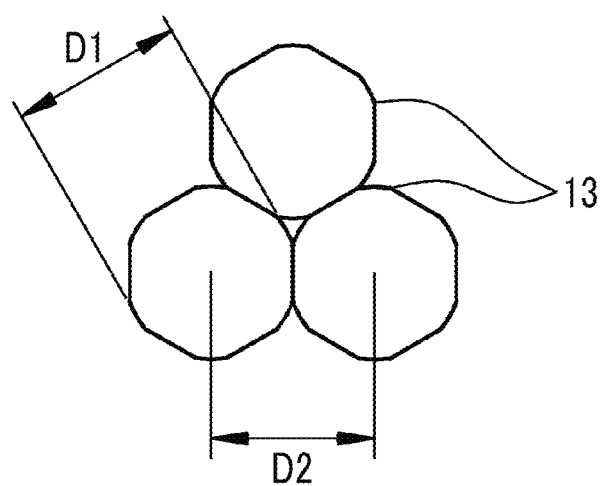
FIG. 5 is an explanatory view schematically showing the relationship between pore portions in contact with each other.

Although the plurality of pore portions 13 are spherical, the pore portions are not strictly perfectly spherical because the pore portions are arranged in a close-packed structure as described above. The pore portions have a spherical shape in which a perfect sphere is slightly distorted. Accordingly, regarding the pore portions 13 in contact with each other, a distance D2 between the centers (refer to FIG. 5) of the pore portion 13 and another pore portion 13 with which the pore portion 13 is in contact is smaller than a diameter D1 of the pore portion 13 (refer to FIG. 5). Thus, the communication ports 12b are formed, and the voids 12 in which the pore portions 13 communicate with each other are formed. Depending on the kind of the hydrophilic material, the pore portions 13 can be freely deformable. The difference between the diameter D1 of the pore portion 13 and the distance D2 between the centers of the pore portions can be changed depending on production conditions and the like. As shown in FIGS. 2 and 3, the plurality of pore portions 13 communicate with all the pore portions 13 in contact with each other, and form the communication ports 12b in the partition walls 14. Accordingly, the voids 12 penetrate the molded body 10. As shown in FIG. 3, the molded body 10 has a cross section 10c in which the diameters of the opening portions 12a are equal. As described above, since the pore portions 13 communicate with each other and the voids 12 penetrate the molded body, the molded body 10 can be used for various applications, for example, such as a cell culture base, a light scattering prevention filter, a sound absorbing material, and a filtration filter.

Figure 4:
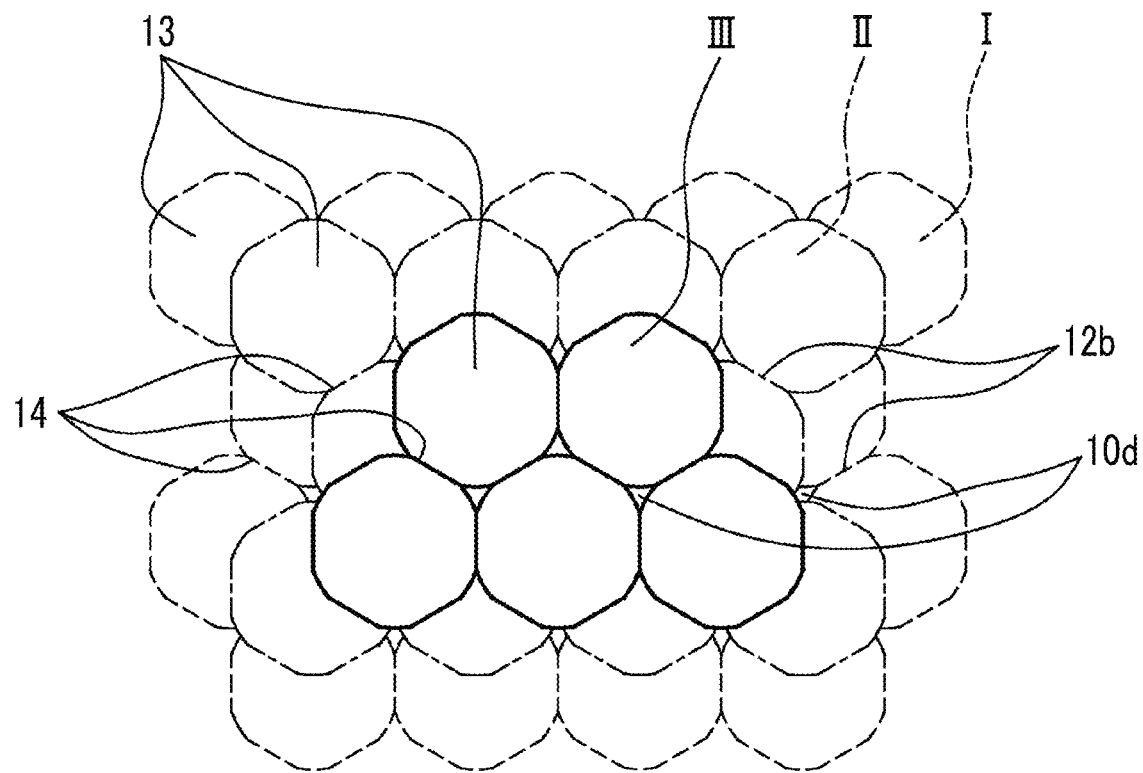
FIG. 4 is an explanatory view schematically showing a structure of pore portions.

The close-packed structure includes both a state in which the pore portions 13 are arranged in a hexagonal close-packed structure and a state in which the pore portions 13 are arranged in a cubic close-packed structure (face-centered cubic lattice structure). The region of the hexagonal close-packed structure and the region of the cubic close-packed structure may be mixed. As shown in FIG. 4, as an example, in a certain portion of the molded body 10, the pore portions 13 are three-dimensionally arranged in a hexagonal close-packed structure. That is, the spherical pore portions 13 are arranged in a three-dimensional hexagonal close-packed structure in such a manner that the pore portions are two-dimensionally densely arranged in a first layer I indicated by a broken line, are two-dimensionally densely arranged in a second layer II indicated by a two-dot broken line so as to overlap with the first layer I, and are two-dimensionally densely arranged so as to further overlap with a third layer III. In the molded body 10, the partition walls 14 and pillars 10d form the voids 12.

The size distribution of the plurality of spherical pore portions 13 is preferably 5% or less. Here, as a spherical body circumscribing the pore portion 13 is assumed, the size of the pore portion 13 refers to the diameter of the spherical body. The size distribution of the pore portions 13 refers to the ratio of the standard deviation to the average value in the sizes of all the pore portions 13 of the molded body 10. Accordingly, the volume fraction of the voids 12 with respect to the entire molded body 10 is about 74% since the pore portions 13 have a close-packed structure. In addition, the volume fraction of the voids can be 74% or more. For example, by setting the size of the pore portions to two kinds, large and small, the volume fraction of the voids becomes 74% or more. The upper limit of the volume fraction of the voids is 90% or less for the reason that the strength of the molded body 10 is maintained.

The diameter D1 of the pore portion 13 is 400μm, but is not limited to this example. The diameter is preferably within a range of 1μm or more and 1 mm or less. The diameter is more preferably within a range of 150μm or more and 750μm or less, and even more preferably within a range of 200μm or more and 600μm or less. Although the shape and size of the molded body are not limited, the molded body 10 according to the embodiment is a cylindrical body having a bottom surface of a diameter of 10 mm and a height of 10 mm as shown in FIG. 1. A molded body having a thickness larger than a film and a thickness of 1 mm or more is regarded as a molded body as a three-dimensional structure.

The molded body 10 is formed of polyacrylamide which is a hydrophilic material. The hydrophilic material forming the molded body 10 has biocompatibility and biodegradability. Examples of other hydrophilic materials forming the molded body 10 include various water-soluble polymers, polysaccharides (for example, cellulose or chitosan), and proteins (for example, collagen or fibroin), and a mixture of at least two of the above materials may be used. The molded body 10 formed of a hydrophilic material can be used for various applications, for example, such as a cell culture base, a light scattering prevention filter, a sound absorbing material, and a filtration filter.

In addition, hydrophilicity means that the solubility with respect to pure water is 0.2 g/ml or more, and hydrophobicity means that the solubility with respect to pure water is 0.01 g/ml or less. In this embodiment, the solubility with respect to pure water is obtained from Test No. 105: Water Solubility, described in OECD guidelines for the Testing of Chemicals (OECD stands for the Organization for Economic Co-operation and Development). In a case where the molding material 20 described later contains a surfactant, the obtained molded body 10 may also contain a surfactant.

Figure 6:
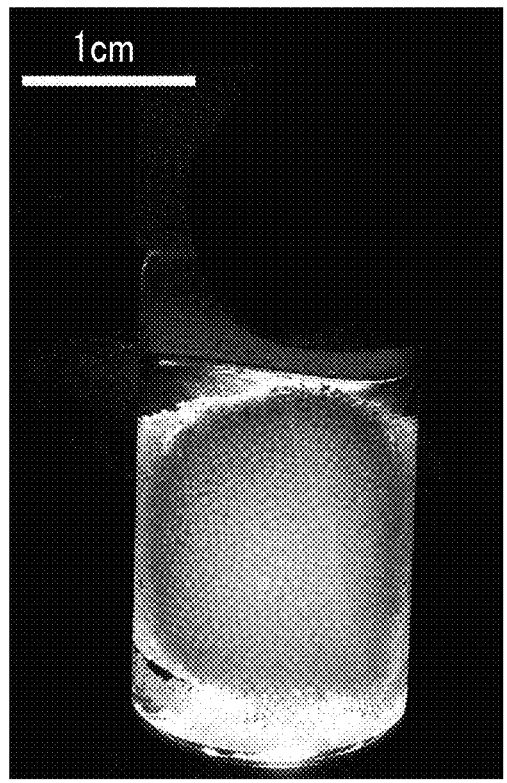
FIG. 6 is an image of the porous molded body obtained according to the first embodiment photographed by a digital camera.
Figure 7:
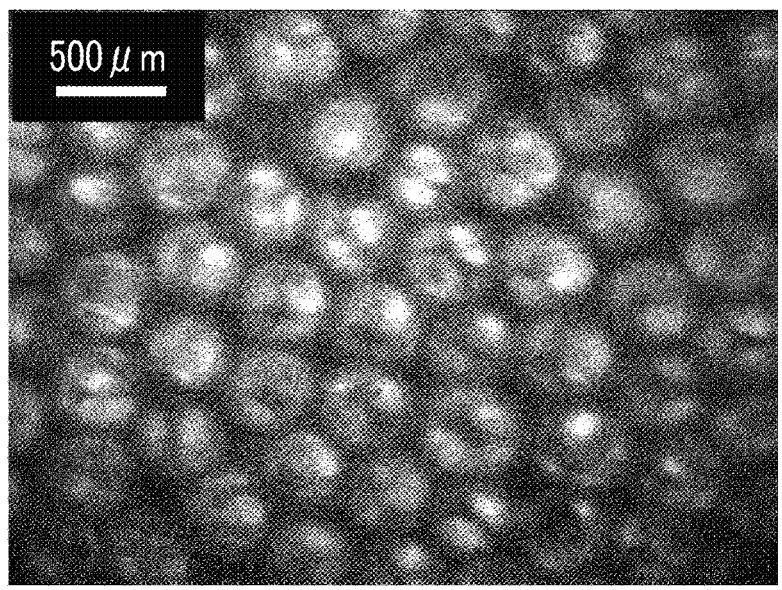
FIG. 7 is an image of the porous molded body obtained according to the first embodiment photographed by an optical microscope.
Figure 8:
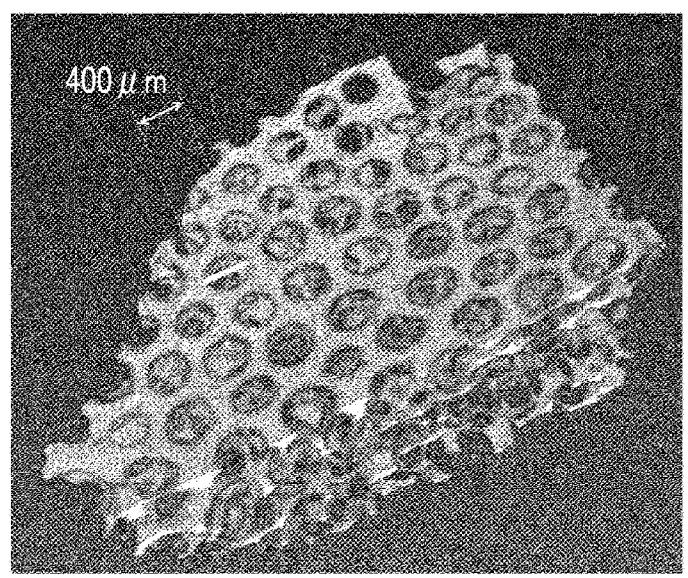
FIG. 8 is an X-ray CT image of the porous molded body obtained according to the first embodiment.

As described above, the aspect of the molded body 10 in which the pore portions 13 are densely arranged with regularity can be confirmed from, for example, an image photographed by a digital camera as shown in FIG. 6, an image photographed by an optical microscope as shown in FIG. 7, and an X-ray computed tomography (CT) image as shown in FIG. 8. FIG. 6 is an image photographed from the outside of the container in a state in which the molded body 10 obtained by a method described later is immersed in water in the container. There is a white lid on the upper part of the container, and FIG. 6 shows an image photographed in a state in which the container is supported by pinching the lid with human fingers. FIG. 7 is an image obtained by photographing the molded body 10 in a state of being immersed in water in the container as in FIG. 6. The image of FIG. 8 is a photographed image of the molded body 10 obtained by storing the molded body 10 obtained by a method described later in water, then taking out the molded body 10 from water, and freeze-drying the molded body.

Figure 9:
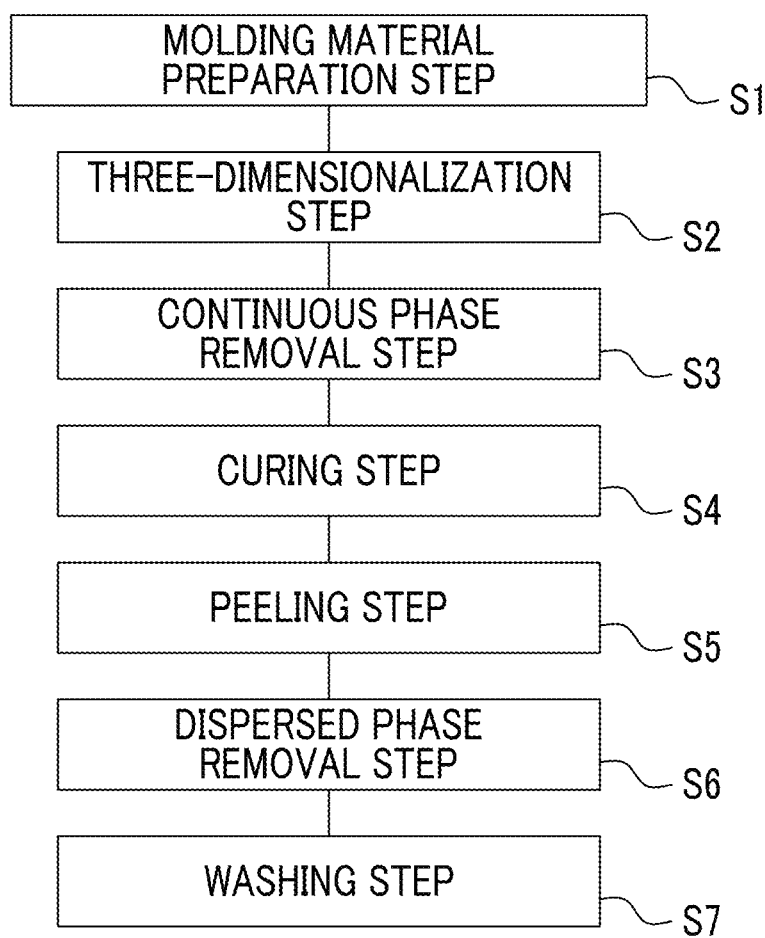
FIG. 9 is an explanatory diagram of the first embodiment of the present invention.

As shown in FIG. 9, the molded body 10 is produced by a production method including a molding material preparation step S1, a three-dimensionalization step S2, a continuous phase removal step S3, a curing step S4, a peeling step S5, a dispersed phase removal step S6, and a washing step S7. The molding material preparation step S1, the continuous phase removal step S3, and the washing step S7 are optional steps, and may not be performed in some cases.

Figure 10:
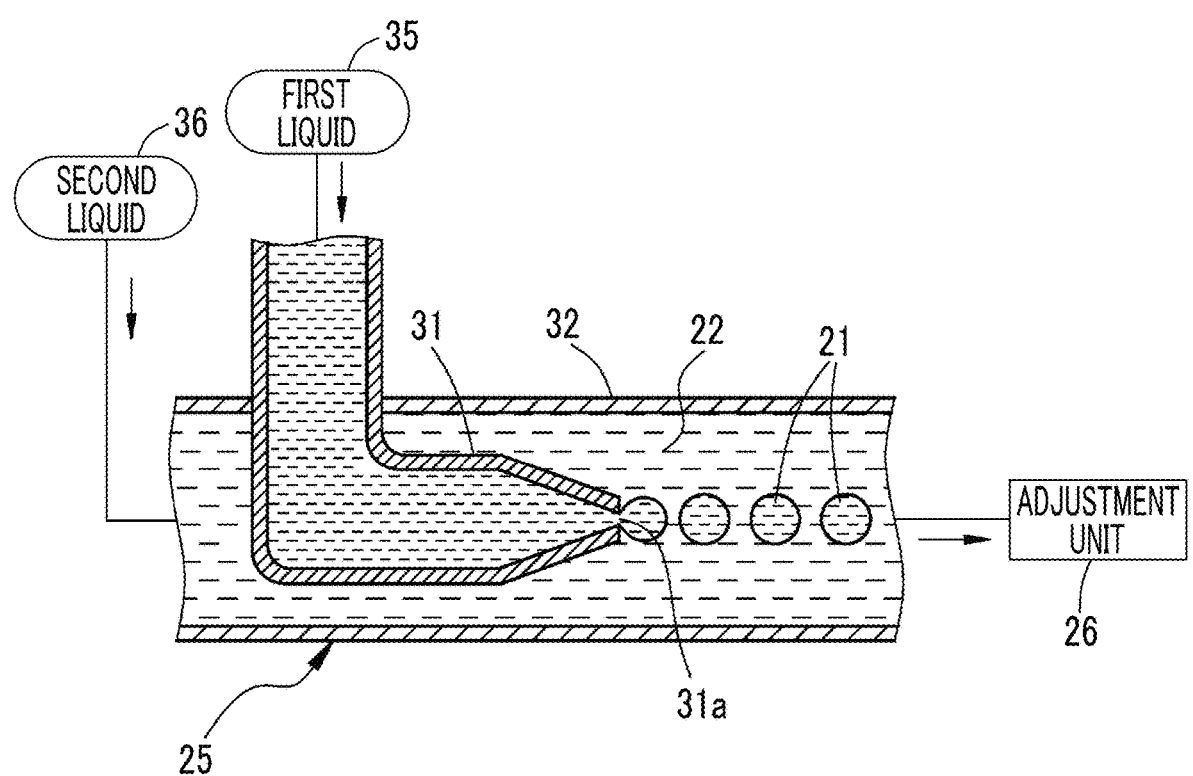
FIG. 10 is a schematic view of a base producing unit.

In the molding material preparation step S1, a molding material 20 (refer to FIG. 13) is prepared. The molded body 10 is produced from the molding material 20 (refer to FIG. 13). The molding material 20 is an emulsion, a liquid droplet, which is a dispersed phase 21 (refer to FIG. 10 or 11) is used as an oil phase, and a continuous phase 22 (refer to FIG. 10 or 11) is used as a water phase. The continuous phase 22 includes a raw material of the material constituting the molded body 10 as a curable compound. As described above, the curable compound of this example becomes a hydrophilic material after curing. The curable compound in this example is acrylamide. The continuous phase 22 may include a solvent of the curable compound. The liquid droplets, which are the dispersed phases 21, function as casting molds (templates) for the pore portions 13 (refer to FIG. 2) in the molded body 10, and include polydimethylsiloxane and bromobenzene in the example.

The continuous phase 22 include a curable compound as described above. In the example, the continuous phase 22 contains a curable compound and water as a solvent of the curable compound, but in a case where the curable compound is a liquid incompatible with the dispersed phase 21 which is a hydrophobic liquid, the continuous phase 22 may not contain water. In addition, the liquid incompatible with the hydrophobic liquid means that the solubility of the liquid with respect to the hydrophobic liquid is 0.01 g/ml or less.

Examples of the curable compound in a case where the continuous phase 22 is a water phase include a compound in which a curable functional group is modified with a hydrophilic monomer, and this compound can be obtained by modifying a functional group having energy ray curability (including photocurability) and/or thermosetting properties by the method in a handbook of organic synthesis (for example, organic synthesis experiment handbook (Organic Synthetic Chemistry Association)), and the like.

In the example, the curable compound is an ultraviolet curable compound that is cured by irradiation with ultraviolet rays, but is not limited thereto. As the curable compound, an energy ray-curable compound that is cured by irradiation with energy rays, a thermosetting compound that is cured by heating, and an ion-curable compound that is cured by an ionic reaction can be used. An example of the energy ray-curable compound that is cured by irradiation with energy rays is a photocurable compound that is cured by irradiation with light such as ultraviolet rays. Examples of the ion-curable compound include a system in which sodium alginate is allowed to react with a polyvalent cation such as calcium (Ca) ion.

It is preferable that the curable compound has biocompatibility. Thereby, the molded body 10 that can be used for a cell culture base, a hemostatic material, an adhesion preventing material, and/or a wound dressing material is obtained. The biocompatibility means a property that does not have a harmful effect on a living body such as toxicity to the living body in a case where a material is placed in the living body (including the inside of the digestive tract) or in a case where a material is attached to the outside of the living body.

The molding material 20 may contain a crosslinking agent for curing the curable compound in the continuous phase 22, and in the example, N,N'-methylenebisacrylamide (manufactured by Tokyo Chemical Industry Co., Ltd.) is contained as a crosslinking agent. In addition, the continuous phase 22 may contain an initiator for initiating the curing of the curable compound, and in the example, IRGACURE (registered trademark) 2959 (manufactured by BASF SE) is contained as an initiator.

The liquid droplets of the dispersed phase 21 are preferably flexible and freely deformable, and the same is applied in the example. In addition, the diameter of the liquid droplet as the dispersed phase 21 is preferably within a range of 20μm or more and 1 mm or less. In a case where the diameter is 20μm or more, compared with a case where the diameter is less than 20μm, the liquid droplets are less likely to coalesce and are more reliably maintained as freely deformable liquid droplets of the dispersed phase 21. In a case where the diameter is 1 mm or less, compared with a case where the diameter is more than 1 mm, the shape of the liquid droplets can be more reliably maintained in a spherical shape in a left state. The diameter of the dispersed phase 21 is more preferably within a range of 0.1 mm or more and 1 mm or less, and even more preferably within a range of 0.2 mm or more and 0.6 mm or less.

It is preferable that there is a difference in specific gravity between the dispersed phase 21 and the continuous phase 22. In a case where the specific gravity of the dispersed phase 21 is Y1 and the specific gravity of the continuous phase 22 is Y2, a specific gravity difference obtained by Y1−Y2 is preferably 0.001 or more, and is set to 0.080 in the example. In a case where the specific gravity difference is 0.001 or more, compared with a case where the specific gravity difference is less than 0.001, it becomes easy to unevenly distribute the dispersed phase 21 in the molding material 20 in a vertical direction, that is, to unevenly distribute the dispersed phase 21 downward. As described above, since the dispersed phase 21 and the continuous phase 22 are more easily separated in the molding material 20 in the vertical direction, in the three-dimensionalization step S2, the molding material 20 can be maintained in a state in which the dispersed phases 21 are more reliably in contact with each other. In a case where the molded body 10 is produced, the floating of the dispersed phase 21 is suppressed in the three-dimensionalization step S2 and the curing step S4, so that the molded body 10 can be easily produced.

The specific gravity difference is more preferably within a range of 0.001 or more and 0.200 or less. In a case where the specific gravity difference is 0.200 or less, compared with a case where the specific gravity difference is more than 0.200, the coalescence of the dispersed phases 21 as liquid droplets is suppressed more reliably and/or for a long period of time. For example, in a case where the specific gravity difference is too large, the dispersed phases 21 in a state in which the dispersed phases are unevenly distributed downward (precipitation state) may be crushed and the stable state as liquid droplets may be disturbed. The specific gravity difference is more preferably within a range of 0.030 or more and 0.150 or less, and particularly preferably within a range of 0.050 or more and 0.100 or less.

The specific gravity Y1 and the specific gravity Y2 are obtained on the basis that the specific gravity of water at 25° C. is 1. In the embodiment, more specifically, the specific gravity of a first liquid 35 described later is set to Y1, the specific gravity of a second liquid 36 described later is set to Y2, and the specific gravities Y1 and Y2 are obtained by preparing the first liquid 35 and the second liquid 36 each having a volume V at 25° C., measuring the mass W of each of the prepared first liquid 35 and the second liquid 36 ten times, and calculating a value by an expression of W/V for each measurement value. Then, the average value of the ten calculated values of each liquid is obtained as the specific gravities Y1 and Y2.

In the molding material 20, a volume ratio of the dispersed phase 21 is within a range of 0.5 or more and 0.9 or less, and the molding material contains the dispersed phase 21 at such a high volume ratio. In a case where the volume of the dispersed phase 21 is X1 and the volume of the continuous phase 22 is X2, the volume ratio of the dispersed phase 21 is obtained by X1/(X1+X2). In a case where the volume ratio of the dispersed phase 21 is 0.5 or more, compared with a case where the volume ratio is less than 0.5, the liquid droplets as the dispersed phase 21 are arranged in a state of being in contact with each other, and the arrangement thereof is more regular. In a case where the volume ratio of the dispersed phase 21 is 0.9 or less, compared with a case where the volume ratio is more than 0.9, the coalescence of the dispersed phases 21 can be more reliably suppressed. Therefore, the molded body 10 in which the voids 13 having a uniform size are regularly arranged is more easily produced.

The volume ratio of the dispersed phase 21 is more preferably 0.6 or more and 0.85 or less, and even more preferably 0.7 or more and 0.8 or less. As a method of obtaining the volume ratio of the dispersed phase 21, for example, there is a method of obtaining the volume ratio from an image observed with a microscope. Specifically, the average size and the number density of the liquid droplets of the dispersed phase 21 are obtained from the observed image of the molding material 20, and the volume ratio of the dispersed phase 21 can be calculated from the average size and the number density. In addition, in a case where the volume ratio of the dispersed phase 21 of the molding material 20 is the same as the volume ratio of the pore portions 13 of the obtained molded body 10, the average size and the number density of the pore portions 13 are obtained from the observed image of the molded body 10, and the volume ratio of the pore portions 13 is obtained from these values. The obtained volume ratio may be regarded as the volume ratio of the dispersed phase 21 in the molding material 20.

The molding material 20 may contain a surfactant, and in the example, the molding material contains a polyvinyl alcohol as a surfactant. Other examples of the surfactant include surfactants having an HLB value of 11 or more and 16 or less, such as ADEKATOL (registered trademark) LA and NIKKOL Hexaglyn 1-M (hexaglyceryl monomyristate).

The molding material 20 preferably contains a specific gravity adjusting agent. In this example, a compound that increases the specific gravity of the dispersed phase 21 is used as a specific gravity adjusting agent, but a specific gravity adjusting agent that adjusts the specific gravity of at least one of the dispersed phase 21 or the continuous phase 22 may be used. In this example, bromobenzene having a higher specific gravity than polydimethylsiloxane is used as a specific gravity adjusting agent in order to increase the specific gravity of the dispersed phase 21. However, in a case where the dispersed phase 21 is an oil phase, the specific gravity adjusting agent that increases the specific gravity of the dispersed phase 21 is not limited thereto, and a compound that is present in a state of being dissolved in the dispersed phase 21 and has a higher specific gravity than a component of the dispersed phase 21 (in this example, polydimethylsiloxane) may be used. For example, chloroform and/or carbon tetrachloride can be used.

The specific gravity adjusting agent is preferably contained in the dispersed phase 21 as in the example. Further, it is preferable that the specific gravity adjusting agent is contained at a mass ratio within a range of 1% or more and 30% or less with respect to the dispersed phase 21. In a case where the mass of the dispersed phase 21 (including the mass of the specific gravity adjusting agent) is M1, and the mass of the specific gravity adjusting agent contained in the dispersed phase 21 is M2, the mass ratio is a percentage obtained by (M2/M1)×100.

The molding material preparation step S1 is a step of producing the molding material 20. The molding material preparation step S1 has a base production step and an uneven distribution step. The molding material 20 can be made by a base producing unit 25 and an adjustment unit 26 shown in FIG. 10. A base producing unit 27 shown in FIG. 11 may be used instead of the base producing unit 25. The base producing unit 25 produces an emulsion base 37 in which the volume ratio of the dispersed phase 21 is smaller than that of the molding material 20. The base producing unit 25 includes a first pipe 31 and a second pipe 32 having a circular cross section. The first pipe 31 supplies a first liquid 35 that becomes the dispersed phase 21. The second pipe 32 feeds a second liquid 36 that becomes the continuous phase 22. An opening 31a on one end side of the first pipe 31 is disposed in a state in which the opening is directed to a direction of the flow of the second liquid 36 flowing in the hollow portion of the second pipe 32 in one direction (toward the downstream side in the flow direction of the second liquid 36). Thus, the first liquid 35 is discharged as a liquid droplet from the opening 31a in the flow direction of the second liquid 36. The opening 31a is located substantially at the center of the circular cross section of the second pipe 32.

In the embodiment, the first pipe 31 having an outer diameter within a range of 0.8 mm or more and 3.0 mm or less, and the second pipe 32 having an inner diameter larger than the outer diameter of the first pipe 31 and having an outer diameter within a range of approximately 1.4 mm or more and 4.0 mm or less are used. However, the first pipe 31 and the second pipe 32 are not limited to this example.

In a case where the feeding flow rate of the first liquid 35 is V1 and the feeding flow rate of the second liquid 36 is V2, in the embodiment, for example, by supplying the first liquid 35 and the second liquid 36 under the following conditions that V1 is set to 3 ml/hr, and V2 is set to 4.5 ml/hr, the dispersed phase 21 is generated, and thereby, an emulsion base 37 in which the diameters of the dispersed phases 21 are uniform is produced. The base producing unit 25 is particularly effective in a case where the dispersed phase 21 has a relatively large diameter within a range of 300μm or more and 1 mm or less.

Figure 11:
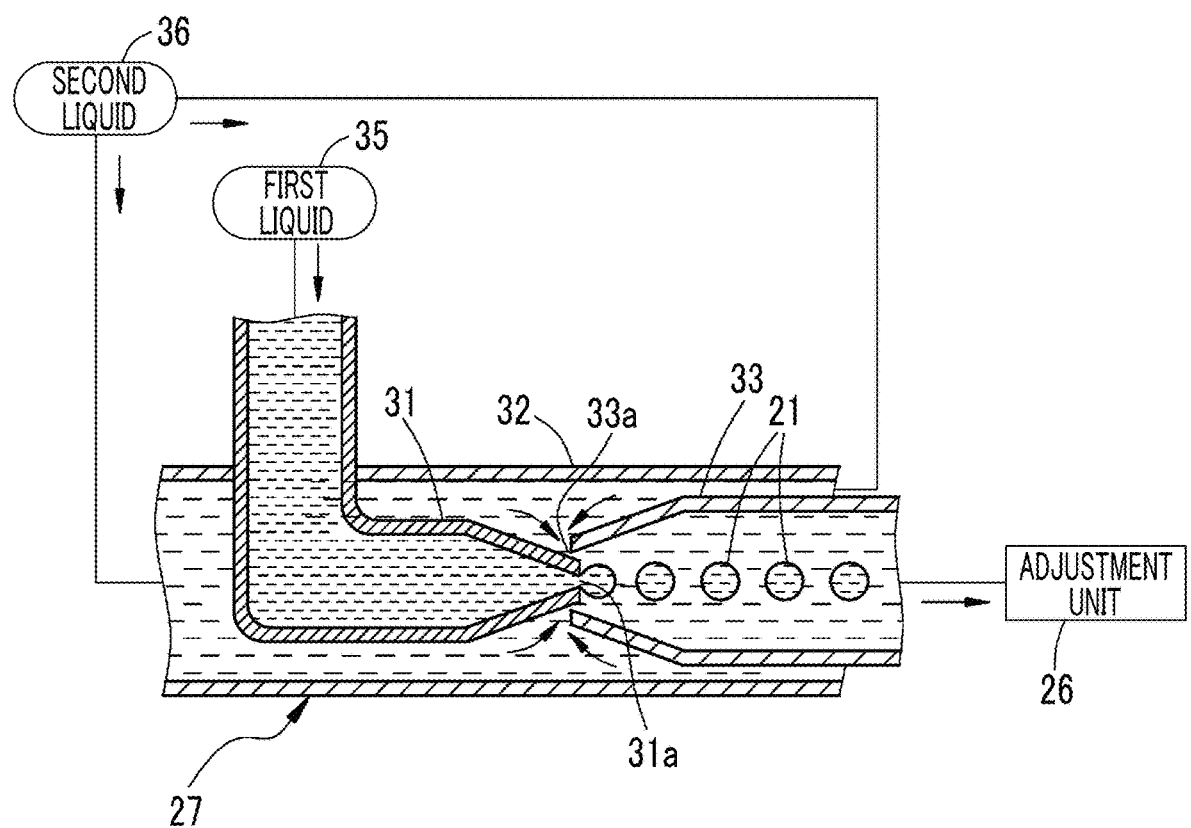
FIG. 11 is a schematic view of another base producing unit.

The base producing unit 27 shown in FIG. 11 is particularly effective in a case where the dispersed phase 21 having a relatively small diameter of 100μm or more and 350μm or less is formed. The base producing unit 27 is configured such that a third pipe 33 is added to the base producing unit 25, and the second liquid 36 is fed from both of one end and the other end of the second pipe 32 to the hollow portion of the second pipe 32. The third pipe 33 is a pipe for producing the emulsion base 37.

Similarly to the first pipe 31, the third pipe 33 is fitted to the second pipe 32 in a state in which one end side is disposed in the hollow portion of the second pipe 32. The third pipe 33 is provided in the hollow portion of the second pipe 32 in a state in which one end side thereof faces the aforementioned one end side of the first pipe 31. An opening 33a at one end of the third pipe 33 is formed larger than the opening 31a of the first pipe 31, and in this example, the opening 33a is arranged in a state in which the opening surrounds one end of the first pipe 31 on the opening 31a side. However, the positional relationship between the opening 31a and the opening 33a in the lateral direction in FIG. 12 is appropriately set according to properties such as the viscosity of the first liquid 35 and the second liquid 36, the feeding flow rate V1, and the feeding flow rates V2a and V2b described later, each diameter of the first pipe 31, the second pipe 32, and the third pipe 33, and/or the diameter of the liquid droplet of the desired dispersed phase 21.

Here, the feeding flow rate of the second liquid 36 from one end side to which the first pipe 31 is fitted in the longitudinal direction of the second pipe 32 is set to V2a, and the feeding flow rate of the second liquid 36 from the other end side to which the third pipe 33 is fitted is set to V2b. For example, the first liquid 35 and the second liquid 36 are supplied in a state in which V1 is set to 2 ml/hr, V2a is set to 3 ml/hr, and V2b is set to 3 ml/hr. Thus, the dispersed phase 21 as a liquid droplet is generated in the hollow portion (flow path) of the third pipe 33, and the emulsion base 37 is produced (base production step). However, the feeding flow rates V1, V2a, and V2b are not limited to this example.

Figure 12:
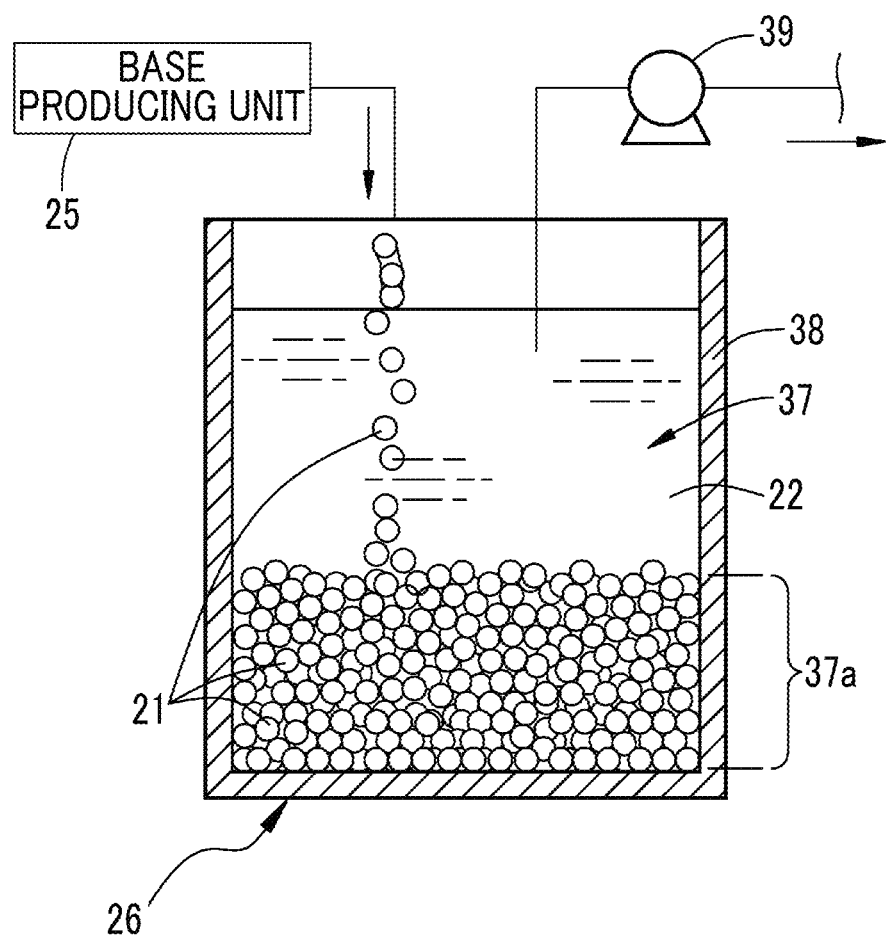
FIG. 12 is a schematic view of an adjustment unit.

The obtained emulsion base 37 is fed to a container 38 of the adjustment unit 26 shown in FIG. 12. As shown in FIG. 12, the adjustment unit 26 includes the container 38 that stores the emulsion base 37, and a pump 39. The pump 39 sucks the second liquid 36 from the emulsion base 37 in the container 38, thereby increasing the volume ratio of the dispersed phase 21 in the emulsion base 37. Thus, the molding material 20 is obtained.

Since the specific gravity of the dispersed phase 21 is greater than the specific gravity of the continuous phase 22 constituted of the second liquid 36, the dispersed phase 21 tends to sink downward. Therefore, in the example, the dispersed phase 21 is unevenly distributed in the emulsion base 37, and the dispersed phase 21 is precipitated at the lower part. Thereby, it becomes easy to selectively suck the second liquid 36 from the upper part of the emulsion base 37, and the yield of the molding material 20 from the emulsion base 37 is improved.

It is preferable that in the lower part of the emulsion base 37, a region 37a (hereinafter, referred to as an uneven distribution region) in which the volume ratio of the dispersed phase 21 is higher than the volume ratio in the upper part and is within a range of 0.5 or more and 0.9 or less is formed (uneven distribution step), and in the example, the same is applied. Thus, as in a case of using the adjustment unit 26, the molding material 20 can be obtained by removing the second liquid 36 from the upper part. Also, for example, by extracting the uneven distribution region 37a from the lower part of the container 38 using gravity, the extracted uneven distribution region 37a can be used as the molding material 20 as it is. Therefore, work efficiency is improved. In addition, since the step of obtaining the molding material 20 from the emulsion base 37 can be automated, the production efficiency of the molded body 10 is improved.

Figure 13:
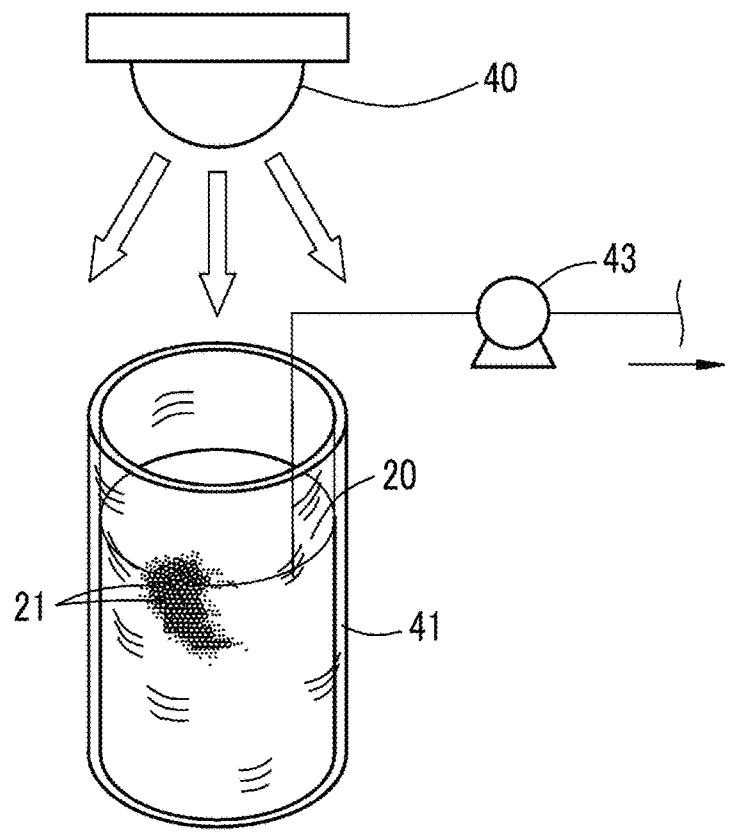
FIG. 13 is an explanatory view of a three-dimensionalization step, a continuous phase removal step, and a curing step.

As shown in FIG. 13, the three-dimensionalization step S2 is a step of placing the molding material 20 in a container 41 having a size including the entire outside of the molded body 10. In this example, a container 41 having an inner wall which is the outer shape (shape and size) of the molded body 10 is used. The container 41 is a glass container through which light from a light source 40 passes. The container 41 consisting of a hydrophobic material may be used from the viewpoint of easy separation between the container 41 and the molded body 10 formed of a hydrophilic material. In a case where the dispersed phases 21 are in contact with each other when the molding material is stored in the container, the molding material may be immediately subjected to the curing step S4. In addition, in a case where a region where the dispersed phases 21 are separated from each other is found in the molding material 20 when the molding material is stored in the container, a treatment in which the molding material is left to stand or gently vibrated and/or oscillated until the dispersed phases are in contact with each other or the like may be performed, and then the material may be subjected to the curing step S4.

In the continuous phase removal step S3, after the dispersed phases 21 are in contact with each other due to the specific gravity difference between the dispersed phase 21 and the continuous phase 22, in a case where the arrangement of the dispersed phase 21 is almost absent in the upper part of the container 41, that is, in a case where almost only the continuous phase 22 is present, a step of removing the continuous phase 22 is performed. A pump 43 can be used to remove the continuous phase 22.

The curing step S4 is a step of curing the curable compound contained in the continuous phase 22 of the molding material 20 as shown in FIG. 13. In the curing step S4, the container 41 is placed under the light source 40 to cure the curable compound in the molding material 20. Since acrylamide, which is the curable compound in the example, is a photocurable compound, the light source 40 is used in the curing step, for example, as shown in FIG. 13. In the curing step, the container 41 is placed under the light source 40 described above to cure the curable compound in the molding material 20. Since the light only needs to be emitted to the molding material 20, the positional relationship between the light source 40 and the container 41 is not particularly limited. In addition, a plurality of light sources 40 may be disposed around the container 41 and emit light toward the container 41 from different directions. The light source 40 is disposed above the glass container 41 containing the molding material 20. In this state, by emitting light for curing the curable compound from the light source 40, the molding material 20 is irradiated with light through the transparent container 41, and the curable compound is cured by the irradiation. Thus, the molding material 20 becomes a cured product 42 formed by solidifying the continuous phase 22. The light source 40 in this example emits ultraviolet rays as light.

A curing device for the curing step S4 is not limited to the light source 40 and is determined according to the curing method. For example, in a case where the curable compound is a thermosetting compound that is cured by heating, various heating devices such as a heating oven (heating constant temperature bath) or an infrared heater may be used in the curing step S4. In a case where the curable compound is an ion-curable compound that is cured by an ionic reaction, for example, a liquid tank containing an ionic solution is used as a curing device. As a specific method, the ionic solution (for example, a solution containing calcium ions) in this liquid tank is injected to the container 41 containing the molding material 20 little by little not to disorder the arrangement of the dispersed phase 21 of the molding material 20, so that the ion-curable compound (for example, sodium alginate) is cured.

The peeling step S5 is a step of separating the cured product 42 obtained by this curing from the container 41. The separation can be performed by any method, and may be performed by using a temperature difference or by peeling. In a case where heat is applied, the entire container 41 can be alternately immersed in cold water and hot water. In the example, the container 41 containing the cured product 42 may be immersed in the water of a bathtub containing water at 25° C. to peel off the cured product 42 from the container 41 or the container 41 containing the cured product 42 may be alternately and repeatedly immersed in a first bathtub (not shown) and a second bathtub (not shown) which are different from each other. In this case, the first bathtub and the second bathtub may have a temperature difference therebetween. In the case of physically performing peeling, the cured product 42 can be separated by partially scraping the surface. The cured product 42 peeled off from the container is subjected to the dispersed phase removal step S6, and the molded body 10 is obtained by removing the dispersed phase 21.

Figure 14:
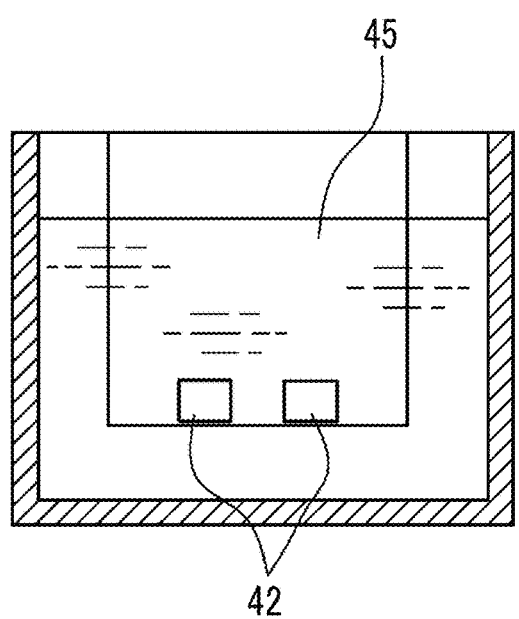
FIG. 14 is an explanatory view of a dispersed phase removal step.

The dispersed phase removal step S6 is a step of removing the dispersed phase 21 from the cured product 42 obtained by the peeling step S4. In this example, as shown in FIG. 14, by immersing the cured product 42 in a liquid 45 that exhibits solubility with respect to the dispersed phase 21 in the cured product 42 and exhibits insolubility with respect to the continuous phase in the cured product 42 (a product produced by curing the curable compound), the dispersed phase 21 is removed from the cured product 42. The liquid used in this example is acetone, but is not limited to acetone. In addition, regarding the liquid 45 to be used, the insolubility with respect to the continuous phase in the cured product 42 is not limited to the meaning that the liquid does not dissolve at all, and as long as the solubility of the continuous phase after curing with respect to the liquid to be used is 0.01 g/ml or less, the liquid may be considered insoluble. However, in a case where the solvent of the curable compound remains in the continuous phase as described above, even in a case where the solubility of the continuous phase is larger than 0.01 g/ml, as long as the solubility of the product produced by curing the curable compound is 0.01 g/ml or less, the liquid may be considered insoluble. Since the dispersed phases 21 are in contact with each other in the cured product 42 due to the specific gravity difference between the dispersed phase 21 and the continuous phase 22, the dispersed phase 21 is easily removed, and the dispersed phase 21 is removed by a method such as drying other than the immersion in the example. Therefore, there is a degree of freedom in selecting a material to be used as the dispersed phase 21. As described above, since there is a degree of freedom in the material used as the dispersed phase 21, there is also a degree of freedom in selecting the material for the continuous phase 22 to be used together with the dispersed phase 21, and as a result, molded bodies 10 of various materials can be obtained.

In the washing step S7, after the dispersed phase removal step S6, the molded body 10 is washed by immersing the molded body 10 in water and/or a solvent as a washing liquid. In a case where the molded body 10 is used for an application unfavorable to impurities, it is preferable to perform the washing step S7.

The molding material 20 is an emulsion, and the continuous phase 22 and the dispersed phase 21 separate from each other. There is a difference in specific gravity between the dispersed phase 21 and the continuous phase 22, and since the specific gravity of the dispersed phase 21 is greater than that of the continuous phase 22, the dispersed phase 21 sinks due to gravity and thereby is highly self-organized. Therefore, when the molded body 10 is produced, the dispersed phases 21 are arranged in a three-dimensional close-packed structure only by placing the molding material 20 in the container 41, which is a mold, in the three-dimensionalization step S2. After the three-dimensionalization step S2, even in a case where there is a portion where the ratio of the continuous phase 22 is high and the dispersed phases 21 are not favorably arranged, the portion where the ratio of the continuous phase 22 is high is removed by the continuous phase removal step S3, and thus, the molded body 10 in which the phases 21 are highly arranged is obtained. Further, by using the uneven distribution region 37a as the molding material 20, the dispersed phases 21 are more easily arranged.

The liquid droplets, which are the deformable dispersed phases 21, function as casting molds for the pore portions 13 in the molded body 10. Since the dispersed phase 21 is contained at the above-described volume ratio, the liquid droplets that are the dispersed phases 21 are arranged in a state of being in contact with each other, and the arrangement thereof becomes more regular. Further, since there is a difference in specific gravity between the dispersed phase 21 and the continuous phase 22, the contact area between the dispersed phases 21 further increases in combination with the specific gravity difference. Therefore, a larger communication port 12b is formed in the obtained molded body 10. For example, in a case where the molded body 10 is used as a cell culture base, an interaction path between cultured cells is secured, and thus it is effective to form the larger communication port 12b. Even in a case where the specific gravity difference between the continuous phase 22 and the dispersed phase 21 is relatively small, the dispersed phases 21 are arranged in a three-dimensional close-packed structure in a self-organizing manner by placing and leaving the molding material 20 in the container.

Further, since the dispersed phases are arranged in a state of being in contact with each other, the dispersed phase 21 is easily removed in the dispersed phase removal step S6, and as a result, the molded body 10 in which the pore portions 13 communicate with each other is obtained. Further, since the dispersed phase 21 is freely deformable, the dispersed phases can be rearranged even in a case where the arrangement with a high degree of regularity is once formed in a self-organizing manner. Therefore, the molding material 20 itself can be stored, transported, and commercialized as it is as a molding material for various applications. Further, since the molded body is produced in a shape following the shape of the container, various shapes can be easily obtained by setting the shape of the container to the shape of the molded body. In addition, by using the container 41 formed of a hydrophobic material, the cured product 42 can be easily taken out from the container 41, and thus the production method becomes easier.

The molded body 10 has the voids 12 opened on the surface, and the voids 12 are formed by mutual communication of the plurality of spherical pore portions 13 arranged in a close-packed structure. The molded body 10 consists of a hydrophilic material and is a molded body in which the pore portions 13 for which the dispersed phases 21 act as casting molds are densely arranged with regularity in any part regardless of the surface or the inside thereof. The expression "any part" does not mean strictness, but means that the pore portions are arranged with a high degree of regularity in most parts of the molded body 10 and the arrangement may be disordered in some parts such as corners and edges. In the production step of the molded body 10, since the dispersed phases 21 highly regularly arranged with a close-packed structure along the container 41 by the step S3 of removing the continuous phase 22 or the like, the opening portions 12a on the surface of the pore portions 13 of the molded body 10 are highly regularly arranged in a close-packed structure. Similarly, also in the inside of the molded body 10, since the dispersed phase 21 are highly regularly arranged with a close-packed structure, the pore portions 13 are also highly regularly arranged in a close-packed structure. In a case where a container having a curved surface is used as the container 41, the surface of the molded body also has the same curved surface as that of the container, and for example, a molded body in which the opening portions 12a are highly regularly arranged along the curved surface like recesses of a golf ball can be obtained.

Therefore, in the molded body 10, the pore portions 13 having a uniform size are highly regularly arranged in a close-packed structure, the pore portions communicate with each other and are opened on the surface 10S, and the opening portions 12a are also highly regularly arranged. Therefore, the molded body is suitable for an application in which it is preferable to provide uniform pore portions 13, an application in which it is preferable to densely fill the pore portions 13 with a substance or the like, and an application in which a large surface area is preferable. In addition, since a light molded body can be used in a case of using the same raw material, the molded body is also suitable for an application in which lightness is preferable.

In addition, a molded body in which the diameter D1 of the pore portions 13 is within a wide range of 1 μm or more and 1 mm or less or a molded body having opening portions 12a within a wide range can be easily obtained by adjusting the diameter of the dispersed phase 21. Therefore, since the size distribution of the pore portions 13 is small, the size of the pore portions 13 can be specified, and a molded body having a specific void volume can be easily obtained, the molded body is suitable for applications such as a sieve and a filter.

In addition, since the hydrophilic material has biocompatibility, the hydrophilic material is suitable for a case where the molded body 10 is used for bio-related applications. In addition, since the hydrophilic material is selected from collagen, polyglycolic acid, chitosan, hydroxyapatite and a derivative or mixture of collagen, polyglycolic acid, chitosan and hydroxyapatite, for example, the hydrophilic material is suitable for an application in which the molded body 10 is used in a human body. In addition, since the hydrophilic material has biodegradability, the load on the environment is small and the hydrophilic material is suitably used.

Second Embodiment

Figure 15:
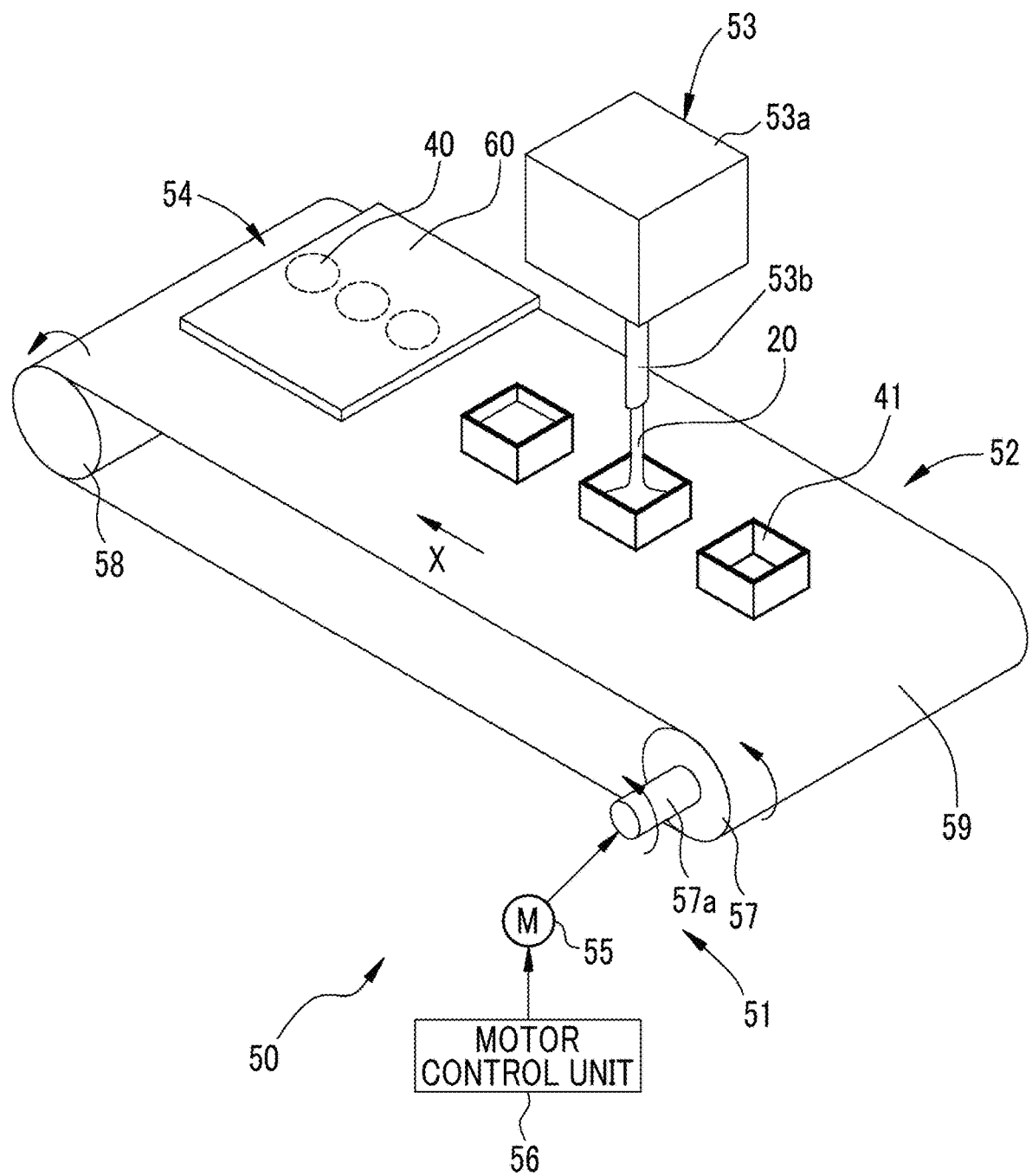
FIG. 15 is an explanatory view of another three-dimensionalization step.

In a second embodiment, the emulsion is placed in a moving container. Hereinafter, the second embodiment will be described with reference to FIG. 15. This example is the same as the first embodiment except that the container is moved. In FIG. 15, the members denoted by the same reference numerals as those in FIGS. 1 to 14 are the same as those described in the first embodiment, and thus the description thereof will be omitted.

In the embodiment, the molding material 20 is supplied to a cured product forming unit 50. The cured product forming unit 50 is for automatically performing the three-dimensionalization step S2 of placing the molding material 20 in the container 41. The cured product forming unit 50 includes a drive unit 51, a material injection unit 52, a material supply unit 53, and a light source unit 54. The drive unit 51 includes a motor 55 and a motor control unit 56. The material injection unit 52 includes a first roller 57 and a second roller 58 that rotate in the circumferential direction, and a belt 59 that is an endless container support formed in a cyclic shape. The first roller 57 includes a shaft 57a. The motor 55 is connected to the shaft 57a connected to the first roller 57, is driven and controlled by the motor control unit 56, and rotates the shaft 57a. The belt 59 is wound around the first roller 57 and the second roller 58. In the example, the first roller 57 is a driving roller having a driving unit, and the second roller 58 is a driven roller. The second roller 58 may be rotated synchronously with, for example, the first roller 57. In addition, at least one of the first roller 57 or the second roller 58 may be a driving roller having a driving unit. As the first roller 57, which is a driving roller, rotates in the circumferential direction, the belt 59 in contact with the circumferential surface continuously travels in the longitudinal direction and circulates. In FIG. 15, an arrow denoted by a symbol X indicates the traveling direction of the belt 59 and the transport direction of the container 41.

The material supply unit 53 is disposed above the belt 59, which is a support of the container 41, and includes a storage unit 53a and an outflow unit 53b. The storage unit 53a stores the molding material 20. The outflow unit 53b is formed as a tubular member protruding from the bottom portion of the outflow unit 53b, and flows out the molding material 20 from an opening (not shown) at the lower end. Since the dispersed phase 21 has a higher specific gravity than the continuous phase 22, the molding material 20 is discharged from the outflow unit 53b in a state where the dispersed phase 21 is dense, and the molding material 20 is supplied into the container 41. The container 41 is installed at a predetermined position on the belt 59 at a predetermined timing by a container transport unit (not shown). As a result, the container 41 is placed on the belt 59 at a predetermined interval and transported, and thus the molding material 20 flows out from the outflow unit 53b at a timing corresponding to the transportation of the container 41, so that the containers 41 containing the molding material 20 are prepared one after another and are transported to the light source unit 54 for performing the next step. After the supply of the molding material 20 and before the transportation to the light source unit 54, the continuous phase removal step S3 may be performed by a suction device (not shown).

The light source unit 54 includes a plurality of light sources 40 and a support member 60 that supports the light sources 40. The support member 60 has a plate-like shape, and is provided above the transport surface of the belt 59. The plurality of light sources 40 are arranged on the surface of the support member 60 facing the belt 59 to be directed downward and aligned in the same direction as the transport direction so that the light source 40 irradiates the container 41 on the belt 59 with light. The light source 40 in this example emits ultraviolet rays as light. The molding material 20 placed in the container 41 is cured by the light source unit 54 while the container 41 is being transported. As the container 41 containing the molding material 20 is transported, a larger amount of ultraviolet rays are emitted from the light source 40, and in a case where the molding material 20 is cured and transported to the end of the light source unit 54, the curing is completed to form a cured product 42. Further, the container 41 is transported, and the container 41 in which the cured product 42 is stored is sequentially collected in a storage container (not shown). The collected container 41 is advanced to the next step similar to the first embodiment.

In the example, by placing the emulsion in the moving container, the three-dimensionalization step S2 can be automated. Further, a plurality of cured products 42 formed by the cured product forming unit 50 can simultaneously treated in the dispersed phase removal step S6 and the washing step S7. Therefore, the production speed of the molded body 10 is improved, which contributes to cost reduction. In the emulsion placed in the container, the alignment of the dispersed phase 21 in the emulsion proceeds depending on the time of the movement. Therefore, the molded body 10 in which the arrangement of the pore portions 13 is further aligned is obtained.

Third Embodiment

Hereinafter, a third embodiment will be described with reference to FIGS. 16 to 20. In FIGS. 16 to 20, the members and the like denoted by the same reference numerals as those in FIGS. 1 to 15 are the same as those described in the first embodiment, and the description thereof will be omitted. The third embodiment is the same as the first embodiment except that the cured product 42 is produced by an additive manufacturing method.

The additive manufacturing method is also referred to as additive manufacturing technology (refer to "2013 Patent Application Technology Trend Survey Report 3D Printer" (Patent Office)) and is a process of creating an object from the three-dimensional shape numerical representation by attaching a material. The additive manufacturing method is often realized by laminating layers on a layer. In addition, each definition of the additive manufacturing method, the following material jetting method, and a stereolithography method is made in ASTM No. F2792-12a (Standard Terminology for Additive Manufacturing Technologies), and in the specification, the same definition is used.

Figure 16:
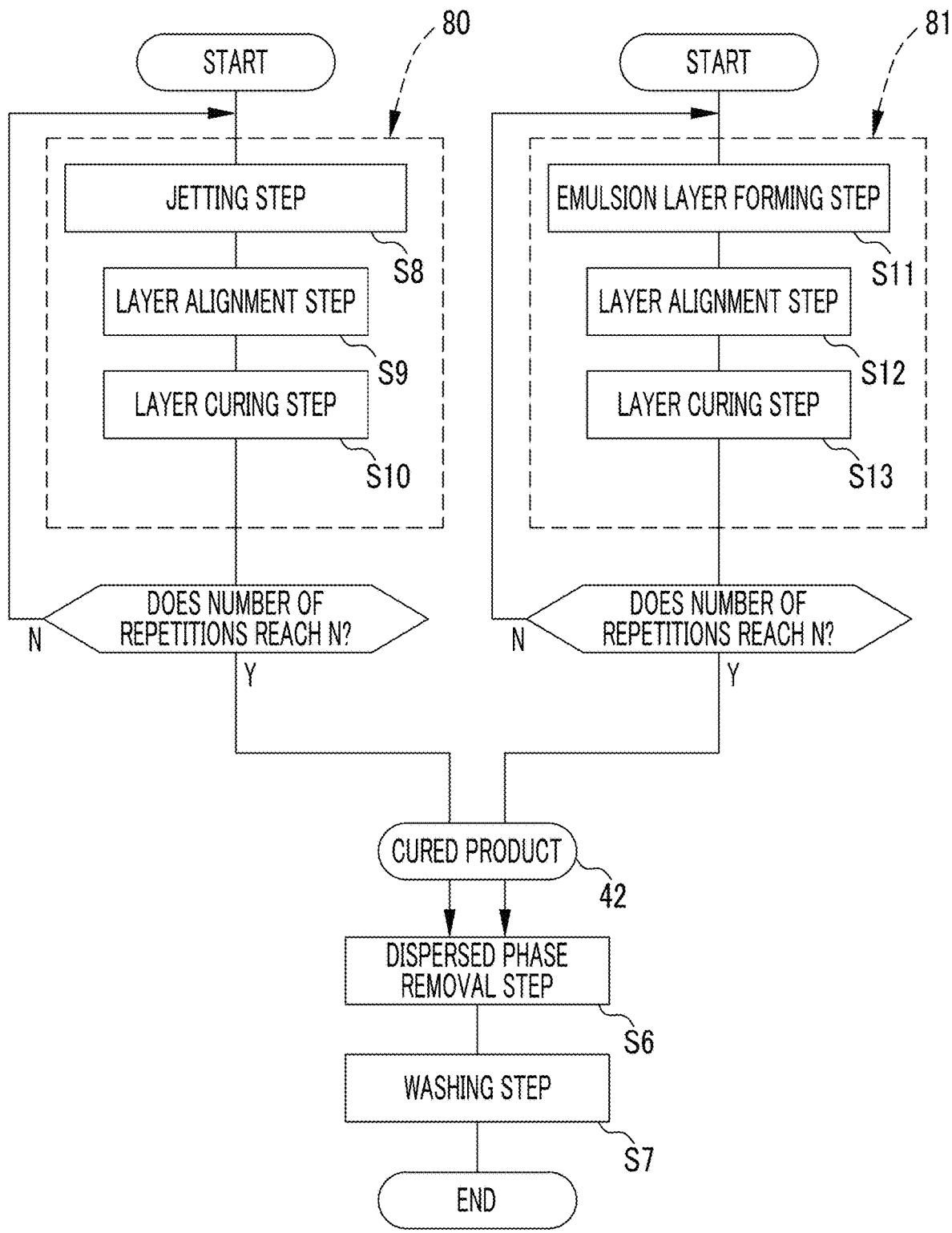
FIG. 16 is an explanatory diagram of an additive manufacturing method.

As shown in FIG. 16, an additive manufacturing step for performing the additive manufacturing method includes a case including a first layer forming step 80 and a case including a second layer forming step 81, and any one of these is repeated to form the cured product 42 (refer to FIG. 14) from the molding material 20 (refer to FIG. 13). A method of repeating the first layer forming step 80 is a so-called material jetting method. A method of repeating the second layer forming step 81 is a so-called stereolithography (vat photopolymerization).

The material jetting method is a method also called an ink jet method. The first layer forming step 80 includes a jetting step S8, a layer alignment step S9, and a layer curing step S10. The jetting step S8 is a step of forming a layered body consisting of an emulsion by jetting the molding material 20 as described later (hereinafter, referred to as an emulsion layer), and the layer curing step S10 is a step of curing the emulsion layer formed by the jetting step to form a cured layer. The cured layer has a shape in which the cured product 42 (refer to FIG. 11) is divided into N (N is a natural number of 2 or more) layers, and the cured product 42 is configured by stacking each layer in the thickness direction. This first layer forming step 80 is repeatedly performed N times to form the cured product 42 in which the cured layers are laminated. Here, the N layers may not have the same thickness as each other. In the first layer forming step 80, the layer arrangement step S9 may be performed after the jetting step S8 and before the layer curing step S10. This layer arrangement step S9 is a step of arranging the dispersed phases in the emulsion layer.

Further, the second layer forming step 81 includes an emulsion layer forming step S11, a layer alignment step S12, and a layer curing step S13. In the emulsion layer forming step S11, an emulsion layer is formed by a method different from the jetting step in the first layer forming step 80, and the details will be described later with reference to another drawing. The layer curing step S13 is a step of curing the emulsion layer formed in the emulsion layer forming step S11 to form a cured layer. By repeating the second layer forming step 81, the cured products 42 (refer to FIG. 14) are formed. Also in the second layer forming step 81, the above-described layer arrangement step S12 may be performed. The dispersed phase 21 (refer to FIG. 7) is removed from the cured product 42 obtained by the additive manufacturing step by the dispersed phase removing step S6, and then the cured product is washed by the washing step S7.

A data generation step is performed before the additive manufacturing step. In the data generation step, the cured product 42 is divided into N layers, that is, a plurality of layers in one direction, and layer data for forming each of these layers is generated based on the shape data of the cured product 42. Since the outer sizes of the cured product 42 and the molded body 10 are the same, layer data may be generated for the molded body 10.

Figure 17:
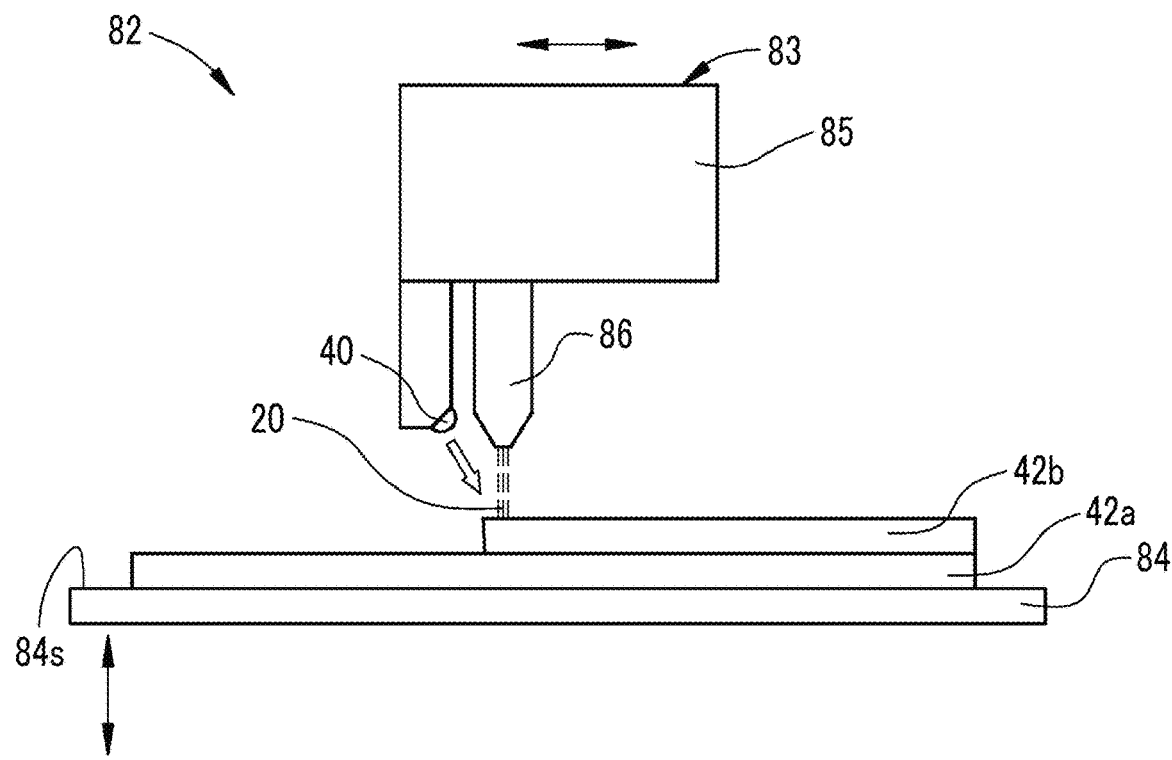
FIG. 17 is an explanatory view of an example of a material jetting method.

In the additive manufacturing step in which the first layer forming step 80 is repeated, for example, an additive manufacturing unit 82 shown in FIG. 17 is used. The additive manufacturing unit 82 includes a head 83 and a forming table 84. The forming table 84 has a forming surface 84s on which the cured product 42 is to be formed, and is provided in a posture in which the forming surface is directed upward. The forming table 84 is freely movable in the vertical direction. The forming table 84 includes a shift mechanism (not shown), and moves in a vertical direction by a predetermined amount of movement by the shift mechanism.

The head 83 includes a head main body 85, a material nozzle 86 provided on the head main body, and a light source 40. The head 83 is disposed above the forming table 84, and the material nozzle 86 and the light source 40 are formed on the lower surface of the head 83 that faces the forming table 84. The head 83 includes a shift mechanism (not shown), and moves in a plane parallel to the forming surface 84s of the forming table 84 by the shift mechanism. The material nozzle 86 ejects the molding material 20 supplied to the head main body 85 from an opening (not shown) at the distal end. The light source 40 is disposed in parallel with the material nozzle 86 in a direction parallel to the forming surface 84s, and in this example, the light source may be disposed in the right direction, the depth direction of the paper plane, or the front direction of the paper plane in FIG. 17 with respect to the material nozzle 86.

The head main body 85 includes a control unit (not shown) that controls the start and stop of the ejecting of the molding material 20 from the material nozzle 86, the ejection flow rate of the molding material 20, and the ON/OFF of the light emission of the light source 40. The control unit controls the timing and flow rate of the ejection of the molding material 20 and the timing of light irradiation.

In this example, the distance between the material nozzle 86 and the light source 40 and the forming table 84 is increased or decreased by moving the forming table 84 in the vertical direction, but the method of increasing or decreasing the distance is not limited thereto. For example, the head 83 may be freely movably provided in the vertical direction, and at least one of the head 83 or the forming table 84 may be moved in the vertical direction. Of course, only the head 83 may be moved in the vertical direction.

The additive manufacturing step using the additive manufacturing unit 82 is as follows. First, the forming table 84 and the material nozzle 86 are disposed at a predetermined distance by positioning the forming table 84 in the vertical direction. Based on the above-described layer data, the molding material 20 is jetted from the material nozzle 86 toward the forming table 84 while the head 83 is being moved in a plane parallel to the forming surface 84s (hereinafter, referred to as in-plane scanning) (jetting step S8) to form a first emulsion layer for one layer by the jetting. As the molding material 20, the uneven distribution region 37a is preferable. The light emission of light source 40 is turned on during the in-plane scanning of the head 83, and the first emulsion layer is irradiated with light (ultraviolet rays in this example) immediately after being formed. Thus, the curable compound included in the continuous phase 22 of the first emulsion layer is cured, and the first emulsion layer becomes a first cured layer 42a (layer curing step S10). Thereafter, the jetting of the molding material 20 from the material nozzle 86 is stopped, and the forming table 84 is moved downward in the vertical direction (downward in the lamination direction) (hereinafter, referred to as movement in the lamination direction), so that the distance between the first cured layer 42a and the material nozzle 86 is made substantially the same as the above-mentioned predetermined distance. During the movement in the lamination direction, the jetting of the molding material 20 is stopped in the embodiment, but may not be not necessarily stopped. Further, during the movement in the lamination direction, the light emission from the light source 40 is in ON state in the example, but may be in OFF state.

Similarly, the jetting step S8 and the layer curing step S10 are performed, and a second cured layer 42b is formed so as to partially overlap with the first cured layer 42a. By repeating the second layer forming step 81, the cured product 42 is formed. Here, "for one layer" includes not only a case where the dispersed phase 21 is a single layer, but also a case where the dispersed phase 21 is formed by overlapping a plurality of layers. In the example, the above-described layer alignment step S9 is performed. The layer alignment step S9 is a step of arranging the plurality of dispersed phases 21 with a high degree of regularity by, for example, the gravity and the surface tension due to the relationship with the compound included in the molding material 20. The layer alignment step can be performed by leaving the molding material for a certain period of time, applying vibration, or the like. In the example, the layer alignment step is performed by leaving the molding material for a certain period of time. The leaving is completed in a few seconds depending on the kind of the molding material 20 and the production conditions. As a method of applying vibration or oscillation, for example, a method of providing a mechanism (not shown) for vibrating or oscillating the forming table 84 and applying vibration to the emulsion layer via the forming table 84 may be used.

Figure 18:
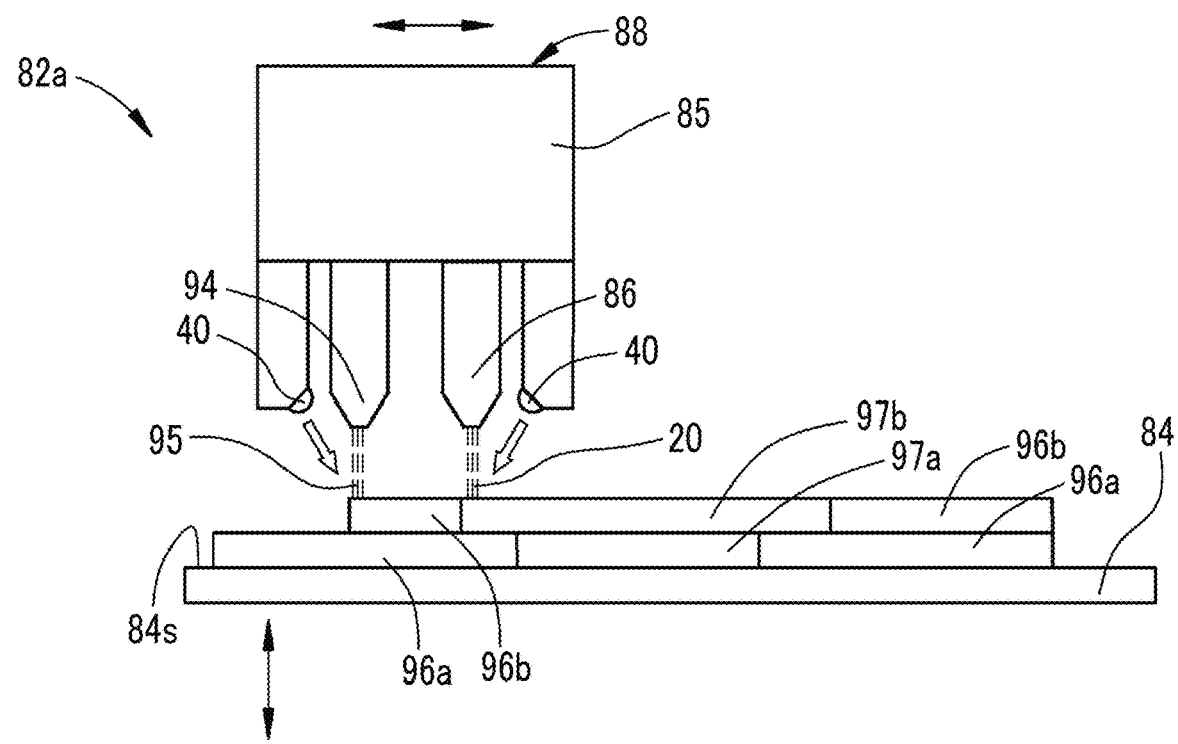
FIG. 18 is an explanatory view of another example of the material jetting method.

Depending on the shape of the molded body to be produced, the cured product 42 may be formed by the additive manufacturing step in which the following first layer forming step 80 is repeated. A case where a cured product (not shown) having a more complicated shape than the cured product 42 is formed will be described as an example with reference to FIG. 18. In FIG. 18, an additive manufacturing unit 82a has a configuration in which the above-mentioned head 83 is replaced with a head 88. The head 88 has a configuration in which a support resin nozzle 94 and a light source 40 are added to the head 83. That is, the head 88 includes a head main body 85, a material nozzle 86 and a support resin nozzle 94 provided on the head main body 85, and two light sources 40. The support resin nozzle 94, the material nozzle 86, and the two light sources 40 are formed on the lower surface of the head 88 that faces the forming table 84. The support resin nozzle 94 ejects a support resin supplied to the head main body 87, which will be described later, from an opening (not shown) at the distal end. The light source 40 added to the head 88 is disposed to be aligned with the support resin nozzle 94 in a direction parallel to the forming surface 84s, and in this example, the light source may be disposed in the right direction, the depth direction of the paper plane, or the front direction of the paper plane in FIG. 18 with respect to the support resin nozzle 94.

A support resin 95 is jetted from the support resin nozzle 94 based on the layer data, and thus a layer (support resin region) consisting of the support resin 95 is formed in a part of the same layer as one emulsion layer. The emulsion layer portion in this layer is referred to as an emulsion resin region. That is, this one layer includes a first support resin layer (not shown) consisting of the support resin region and a first emulsion layer (not shown) consisting of the emulsion resin region. Light (ultraviolet) irradiation is also performed on the first support resin layer, and the first support resin layer becomes a first support layer 96a obtained by curing the support resin. The first emulsion layer becomes a first cured layer 97a by light irradiation. The support resin is formed of a material that can be easily removed after curing. After the forming table 84 is moved in the lamination direction, a second support layer 96b and a second cured layer 97b are similarly formed by the molding material 20 and the support resin 95, and the layers are sequentially laminated and formed in this manner to form the cured product 42 in a state of being supported by a support member in which the support layers such as the first support layer 96a and the second support layer 96b are laminated. Thus, since the emulsion layer can be formed on the support resin layer, it is possible to produce even a molded body having a more complicated shape than the molded body 10.

The head 83 may include two or more of plurality of material nozzles 86. In this case, by using the plurality of material nozzles 86 and jetting the molding material including the dispersed phases 21 having different particle diameters from each material nozzle according to the lamination data, a molded body 10 in which the pore portions 13 having different diameters are formed in each of the plurality of layers of the molded body can be produced. Further, a molded body having a region in which the diameters of the pore portions 13 are different in one layer, a molded body in which the pore portions 13 are changed with gradation, and the like can be easily produced.

Figure 19:
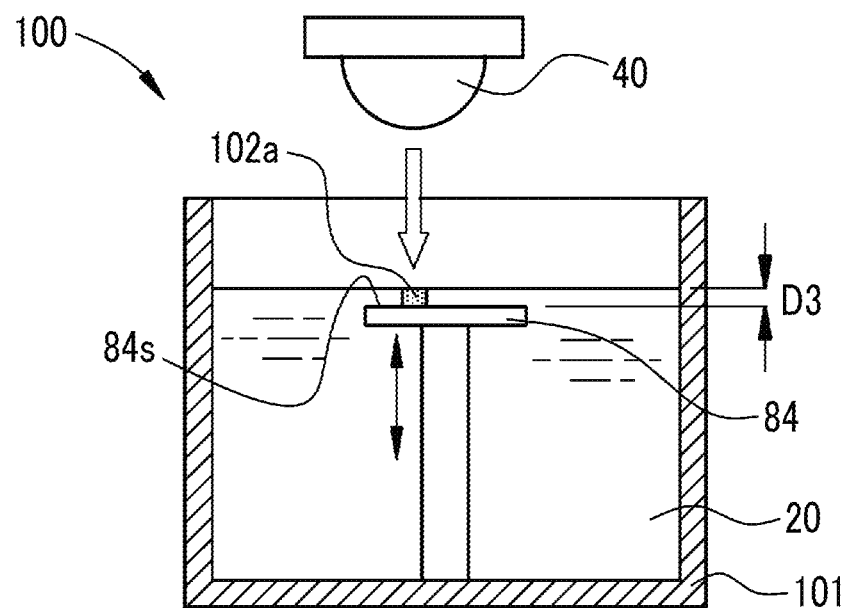
FIG. 19 is an explanatory view of a photocuring step.

In the additive manufacturing step in which the second layer forming step 81 is repeated, for example, an additive manufacturing unit 100 shown in FIG. 19 is used. The additive manufacturing unit 100 includes a forming table 84, a bat 101, and a light source 40. The bat 101 is a container in which the molding material 20 is stored. The forming table 84 is disposed in the bat 101 in a state in which the forming surface 84s is positioned at a position lower than the liquid level in the molding material 20. The light source 40 is disposed above the forming table 84.

The table 85 is positioned at a position sunk from the liquid level of the emulsion with a length D3 of one layer of the molding material 20 to be cured. Thus, the molding material 20 for one layer is placed on the forming table 84 (emulsion layer forming step S11). That is, in this example, for example, the emulsion layer is not formed in the molding material 20 as a visually recognizable layer, but a part of the molding material 20 is virtually considered as a layered body, which is regarded as the emulsion layer. The molding material 20 present on the forming table is used as a first emulsion layer (not shown), the light source 40 then emits light onto the forming table 84, and the first emulsion layer irradiated with the light becomes a first cured layer. 102a (layer curing step S13). Thereafter, the forming table 84 is further moved downward in the vertical direction by the length D3 of one second emulsion layer (movement in the lamination direction). Then, similarly, the emulsion layer forming step S11 and the layer curing step S13 are performed, and a second cured layer (not shown) is formed in a state in which the second cured layer partially overlaps with the first cured layer 102a. By repeating the movement in the lamination direction and the second layer forming step 81, the cured product 42 is formed. Here, "for one layer" includes not only a case where the dispersed phase 21 is a single layer, but also a case where the dispersed phase 21 is formed by overlapping a plurality of layers. The above-described layer alignment step S12 may be performed after the emulsion layer forming step S11 and before the layer curing step S13. In this case, the layer alignment step S12 can also be performed by leaving the molding material for a certain period of time, applying a physical vibration, or the like.

Figure 20:
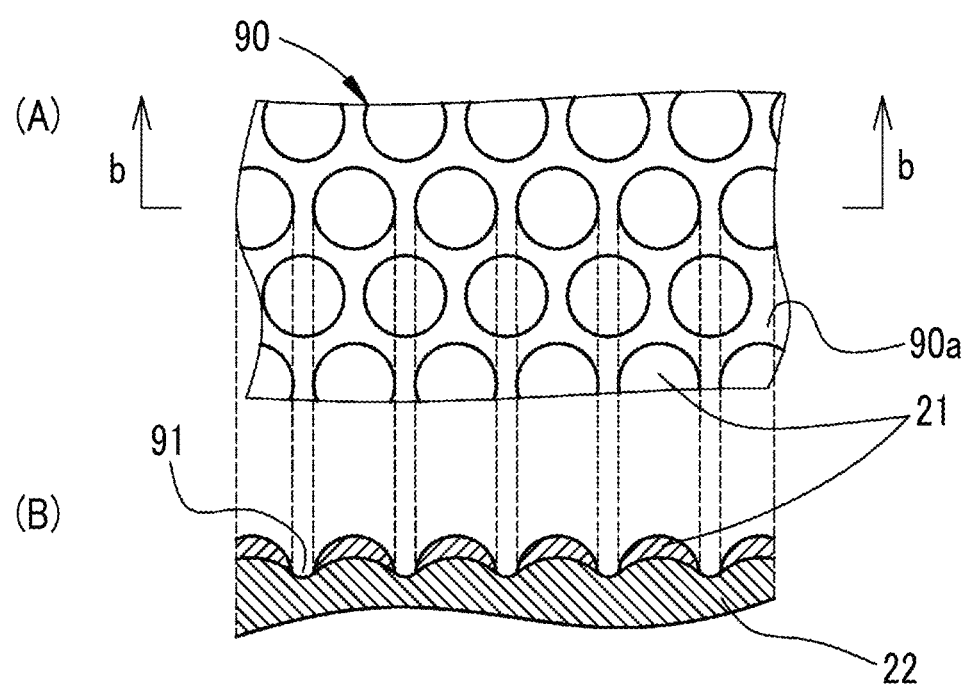
FIG. 20 is a schematic view explaining the surface of a cured film. (A) of FIG. 20 is a schematic view of a part of the surface of the cured film, and (B) of FIG. 20 is a schematic view of a cross section taken along line b-b in (A) of FIG. 20.

As described above, in the first layer forming step 80 and the second layer forming step 81, the uneven distribution region 37a is preferably used as the molding material 20. Accordingly, after the layer curing step S10 for one layer, as shown in FIG. 20, on a surface 90a of a cured layer 90, the dispersed phase 21 has a shape protruding from the continuous phase 22 consisting of a hydrophilic material, and recesses 91 are generated. Therefore, in a case where the next cured layer is formed to overlap with the cured layer 90, the dispersed phase 21 is fitted into the recess 91. Accordingly, the molded body 10 formed by the first layer forming step 80 and the second layer forming step 81 can also be produced as the molded body 10 in which the pore portions 13 communicate with each other and that the voids 12 penetrate.

EXPLANATION OF REFERENCES

10: molded body
10c: cross section
10d: pillar
10B: bottom surface
10S: surface
12: void
12a: opening portion
12b: communication port
13: pore portions
14: partition wall
20: molding material
21: dispersed phase
22: continuous phase
25, 27: base producing unit
26: adjustment unit
31: first pipe
31a, 33a: opening
32: second pipe
33: third pipe
35: first liquid
36: second liquid
37: emulsion base
37a: uneven distribution region
38: container
39: pump
40: light source
41: container
42: cured product
42a: first cured layer
42b: second cured layer
43: pump
45: liquid
50: cured product forming unit
51: drive unit
52: material injection unit
53: material supply unit
53a: storage unit
53b: outflow unit
54: light source unit
55: motor
56: motor control unit
57: first roller (driving)
57a: axis
58: second roller (driven)
59: belt
60: support member
80: first layer forming step
81: second layer forming step
82: additive manufacturing unit
82a: additive manufacturing unit
83: head
84: forming table
85: head main body
85s: forming surface
86: material nozzle
88: head
90: cured layer
90a: surface
91: recess
94: support resin nozzle 95: support resin
96a: first support layer
96b: second support layer
97a: first cured layer
97b: second cured layer
100: additive manufacturing unit
101: bat
102a: first cured layer
D1: diameter of pore portion 13
D2: distance between centers of pore portion 13 and pore portion 13 in contact with pore portion 13
D3: length of one emulsion layer
D10: diameter
H10: height
I: first layer of close-packed structure of plurality of pore portions 13
II: second layer of close-packed structure of plurality of pore portions 13
III: third layer of close-packed structure of plurality of pore portions 13

What is claimed is:

1. A method of producing a porous molded body from an emulsion including a continuous phase and a dispersed phase, the method comprising:
    a three-dimensionalization step of placing the emulsion including a water phase containing a curable compound as the continuous phase in a container;
    prior to curing, a continuous phase removal step of removing the continuous phase, present in an upper part of the emulsion in the container, by suction;
    a curing step of curing the curable compound in a state in which the emulsion is placed in the container to form a cured product;
    a peeling step of separating the container and the cured product; and
    a dispersed phase removal step of removing the dispersed phase of the cured product after the peeling step,
    wherein in the emulsion, in a case where a volume of the dispersed phase is X1 and a volume of the continuous phase is X2, a value of X1/(X1+X2) is within a range of 0.5 or more and 0.9 or less, and a specific gravity of the dispersed phase is greater than a specific gravity of the continuous phase.

2. The method of producing a porous molded body according to claim 1, wherein in the dispersed phase removal step, a solvent of the dispersed phase is brought into contact with the cured product to remove the dispersed phase.

3. The method of producing a porous molded body according to claim 1,
    wherein liquid droplets of the dispersed phase are freely deformable.

4. The method of producing a porous molded body according to claim 1,
    wherein in the emulsion, in a case where a specific gravity of the dispersed phase is Y1 and a specific gravity of the continuous phase is Y2, a specific gravity difference obtained by Y1−Y2 is at least 0.001,
    wherein Y1 and Y2 are obtained on the basis that a specific gravity of water at 25° C. is 1.

5. The method of producing a porous molded body according to claim 1,
    wherein the container is formed of a hydrophobic material.

6. The method of producing a porous molded body according to claim 1,
    wherein in the three-dimensionalization step, the emulsion is placed in the moving container, and the container is moving.

7. The method of producing a porous molded body according to claim 1, further comprising:
    a molding material preparation step having
    a base production step of discharging a first liquid forming the dispersed phase as a liquid droplet in a flow of a second liquid forming the continuous phase from a distal end of a tubular member in a direction of the flow of the second liquid to produce an emulsion base having a value of X1/(X1+X2) smaller than that of the emulsion, and
    an uneven distribution step of unevenly distributing the dispersed phase in the emulsion base to generate an uneven distribution region having a value of X1/(X1+X2) within a range of 0.5 or more and 0.9 or less in the emulsion base,
    wherein the uneven distribution region generated in the emulsion base is used as the emulsion.

* * * * *